US012294148B2

(12) United States Patent
Sayama et al.

(10) Patent No.: US 12,294,148 B2
(45) Date of Patent: May 6, 2025

(54) ANTENNA

(71) Applicant: AGC Inc., Tokyo (JP)

(72) Inventors: Toshiki Sayama, Tokyo (JP); Hideaki Shoji, Tokyo (JP); Yusuke Kato, Tokyo (JP); Shoichi Takeuchi, Tokyo (JP)

(73) Assignee: AGC INC., Tokyo (JP)

( * ) Notice: Subject to any disclaimer, the term of this patent is extended or adjusted under 35 U.S.C. 154(b) by 153 days.

(21) Appl. No.: 18/206,408

(22) Filed: Jun. 6, 2023

(65) Prior Publication Data

US 2023/0318192 A1 Oct. 5, 2023

Related U.S. Application Data

(63) Continuation of application No. PCT/JP2021/044878, filed on Dec. 7, 2021.

(30) Foreign Application Priority Data

Dec. 9, 2020 (JP) ................................ 2020-204527

(51) Int. Cl.
*H01Q 13/12* (2006.01)
*H01Q 5/378* (2015.01)

(52) U.S. Cl.
CPC ............ *H01Q 13/12* (2013.01); *H01Q 5/378* (2015.01)

(58) Field of Classification Search
CPC ...... H01Q 13/10; H01Q 13/12; H01Q 1/3233; H01Q 5/378; H01Q 19/10
See application file for complete search history.

(56) References Cited

U.S. PATENT DOCUMENTS

| | | | |
|---|---|---|---|
| 7,386,294 | B2 | 6/2008 | Inoue |
| 10,749,267 | B2 | 8/2020 | Sone |

(Continued)

FOREIGN PATENT DOCUMENTS

| | | |
|---|---|---|
| JP | 2008-109252 A | 5/2008 |
| JP | 2015-092658 A | 5/2015 |

(Continued)

OTHER PUBLICATIONS

International Searching Authority, "International Search Report," issued in connection with International Patent Application No. PCT/JP2021/044878, dated Mar. 8, 2022.

(Continued)

*Primary Examiner* — Hoang V Nguyen
(74) *Attorney, Agent, or Firm* — Foley & Lardner LLP

(57) ABSTRACT

An antenna includes a first conductor plate and a second conductor plate, the second conductor plate being disposed in the first conductor plate so as to be apart from the first conductor plate with a distance between both plates; wherein the first conductor plate includes a first U-shaped portion, the first U-shaped portion being formed in a U-shape so as to include a first side portion, a second side portion opposed to the first side portion, and a first front portion connected between the first side portion and the second side portion; wherein the second conductor plate includes a second U-shaped portion, the second U-shaped portion being formed in a U-shape so as to include a third side portion, a fourth side portion opposed to the third side portion, and a second front portion connected between the third side portion and the fourth side portion.

20 Claims, 15 Drawing Sheets

(56) References Cited

U.S. PATENT DOCUMENTS

| | | | | |
|---|---|---|---|---|
| 2012/0169562 A1* | 7/2012 | Nysen | H01Q 9/0442 | |
| | | | 343/843 | |
| 2020/0127381 A1 | 4/2020 | Sone | | |

FOREIGN PATENT DOCUMENTS

| | | | |
|---|---|---|---|
| JP | 2017-139686 | A | 8/2017 |
| WO | WO-2019/208453 | A1 | 10/2019 |

OTHER PUBLICATIONS

International Searching Authority, "Written Opinion," issued in connection with International Patent Application No. PCT/JP2021/044878, dated Mar. 8, 2022.

* cited by examiner

ANTENNA

CROSS-REFERENCE TO RELATED PATENT APPLICATIONS

This application is a continuation of PCT Application No. PCT/JP2021/044878, filed on Dec. 7, 2021, which is based upon and claims the benefit of priority from Japanese Patent Application No. 2020-204527, filed on Dec. 9, 2020. The contents of those applications are incorporated herein by reference in their entireties.

TECHNICAL FIELD

The present invention relates to an antenna.

BACKGROUND ART

In recent years, there is a tendency that services have been widely used which utilize high-speed and large-volume wireless communication systems communicating in microwave or millimeter wave frequency bands, for example, transition from 4G LTE to 5G (sub 6). The band used in these systems trends to expand from a 3 GHz bandwidth to a range from 5 GHz bandwidth to 6 GHz bandwidth. V2X (Vehicle to Everything) communication, such as vehicle-to-vehicle communication and road-to-vehicle communication has been used in a variety of applications, such as narrow band communication including European ETC (Electronic Toll Collection System) using a radio wave in a 5.9 GHz band.

The antenna used in the V2X communication may be required to have a directivity over a range from a vehicle traveling direction to a vehicle width direction (directions in a range of ±90° with respect to the traveling direction). As the antenna meeting such requirement is known a vehicle antenna, which includes a radiator plate directed to a vehicle traveling direction, and two elements disposed so as to be apart from each other in a vehicle width direction with respect to the radiator plate (see e.g., Patent Document 1 listed below).

PRIOR ART DOCUMENTS

Patent Documents

Patent Document 1: WO2019/208453

DISCLOSURE OF INVENTION

Technical Problem

For recent years, the antenna having such a relatively wider directivity is required to achieve a further size reduction.

This disclosure provides an antenna, which is capable of achieving not only a size reduction but also a wider directivity.

Solution to Problem

According to one mode of the present invention, there is provided an antenna, which includes:

a first conductor plate and a second conductor plate, the second conductor plate being disposed in the first conductor plate so as to be apart from the first conductor plate with a distance between both plates;

wherein the first conductor plate includes a first U-shaped portion, the first U-shaped portion being formed in a U-shape so as to include a first side portion, a second side portion opposed to the first side portion, and a first front portion connected between the first side portion and the second side portion;

wherein the second conductor plate includes a second U-shaped portion, the second U-shaped portion being formed in a U-shape so as to include a third side portion, a fourth side portion opposed to the third side portion, and a second front portion connected between the third side portion and the fourth side portion;

wherein the second front portion is opposed to the first front portion;

wherein the first front portion has a slot formed therein so as to divide at least one area of the first front portion into a first surface portion and a second surface portion;

wherein the first surface portion has a first feeding point; and wherein the second surface portion has a second feeding point.

Advantageous Effects of Invention

The antenna according to this disclosure achieves both of a size reduction and a wider directivity.

DESCRIPTION OF EMBODIMENTS

Figure 1:
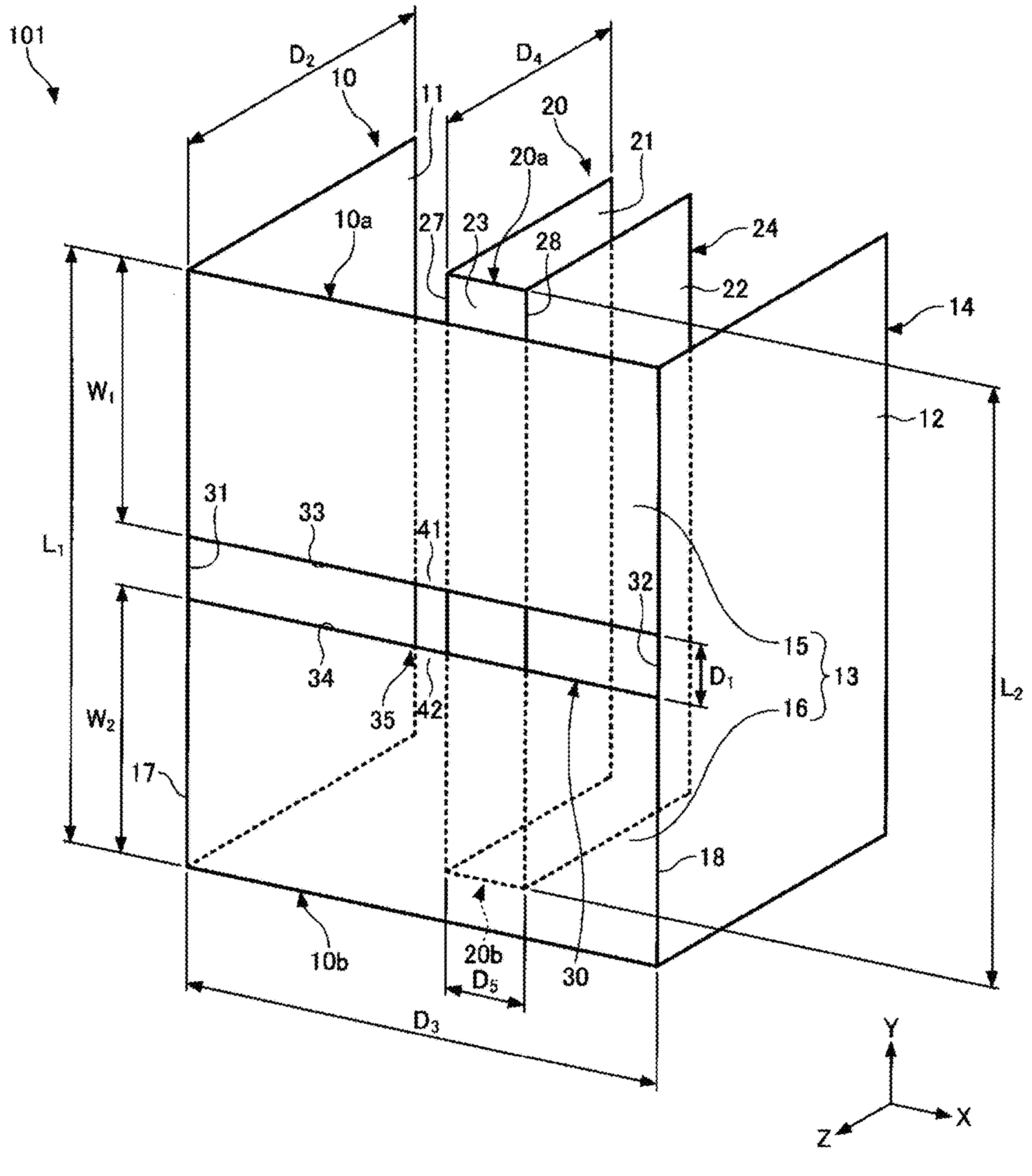
FIG. 1 is a perspective view illustrating an example of the antenna according to a first embodiment.

Now, respective embodiments of this disclosure will be described in reference to the accompanying drawings. The scales of each element shown in the drawings may be different from actual ones for easy understanding. Regarding the wordings indicating directions, such as parallel direction, perpendicular direction, orthogonal direction, horizontal direction, vertical direction, height direction, width direction, deviations are acceptable unless the effects of the embodiments are impaired. The shape of edges is not essential to be rectangular and may be round as in an arcuate form. An X-axis direction, a Y-axis direction, and a Z-axis direction represent a direction in parallel to the X-axis, a direction in parallel to the Y-axis, and a direction in parallel to the Z-axis, respectively. The X-axis direction, the Y-axis direction, and the Z-axis direction are orthogonal to one another. An XY-plane, a YZ-plane, and a ZX-plane represent an imaginary plane in parallel to the X-axis direction and the Y-axis direction, an imaginary plane in parallel to the Y-axis direction and the Z-axis direction, and an imaginary plane in parallel to the Z-axis direction and the X-axis direction, respectively.

The antennas according to the respective embodiments of this disclosure are applicable to, e.g., a V2X communication system, a 5th generation mobile communication system (so-called 5G), and an onboard radar system. The applicable systems are not limited to these systems. The V2X communication system includes an ETC system as an example. The antennas according to the respective embodiments of this disclosure are appropriate to the use in a frequency band of not higher than 6 GHz (sub6) among the frequency bands used in 5G, and suitable to transmit and receive a radio wave (perform one of transmission and reception, or both of them) in a 5.8 GHz or a 5.9 GHz band. Further, the antennas according to the respective embodiments of this disclosure are also applicable to not only the frequency band used in 5G (3.3 GHz or higher) but also 4G LTE, a millimeter wave frequency band (30 GHz to 300 GHz) or a microwave frequency band.

Figure 2:
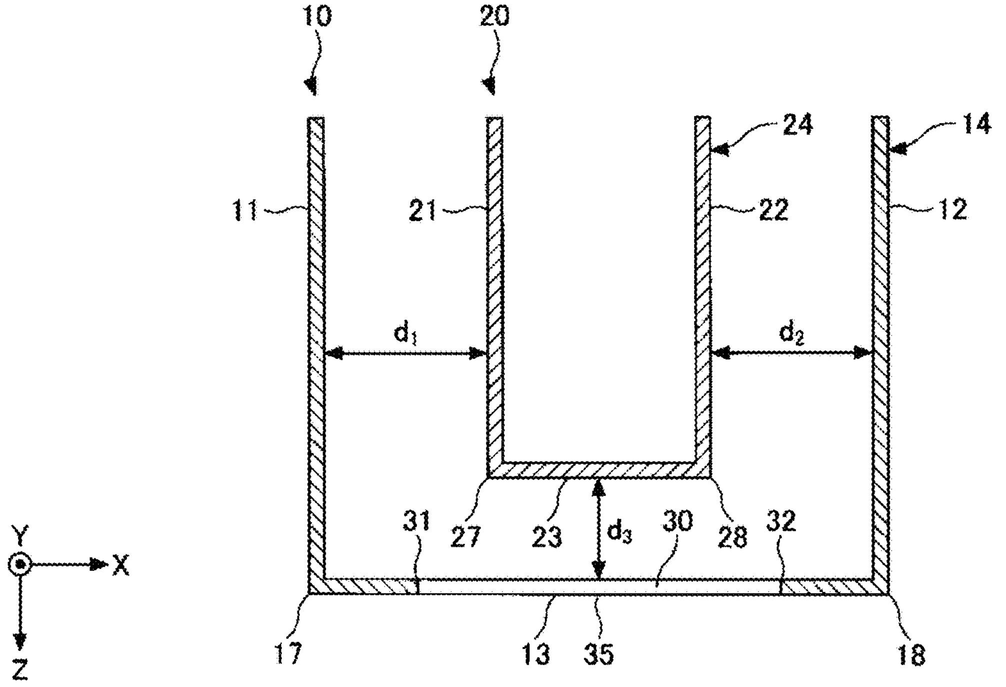
FIG. 2 is a cross-sectional view illustrating the example of the antenna according to the first embodiment in a ZX-plane.

FIG. 1 is a perspective view illustrating an example of the antenna according to a first embodiment. FIG. 2 is a cross-sectional view illustrating the example of the antenna according to the first embodiment in the ZX-plane. The antenna 101 shown in FIGS. 1 and 2 includes an outer conductor plate 10 and an inner conductor plate 20. The conductor plates are not limited to conductive plates and may be conductive films. FIG. 2 is a cross-sectional view of the antenna, which includes a slot 30 formed to have both ends (both slot ends 31 and 32) in the X-axis direction corresponding to a longitudinal direction of the slot 30 while none of the slot ends extend to edges 17 and 18 of the antenna. In FIG. 1 and FIG. 2, the antenna has a front portion 13, which may have an unshown, separate dielectric substrate disposed and fixed on an outer side (side not opposed to a front portion 23 described later). As the dielectric substrate, a PCB (Printed Circuit Board) substrate containing an epoxy resin may be mentioned for example. In particular, when a PCB substrate is disposed on the outer side of the front portion 13, the front portion 13 made of a conductor is preferable to be formed in a planar shape along the XY-plane. The front portion 13 may be positioned on either one of a first principal surface and a second principal surface (surface opposite of the first principal surface) of the PCB substrate.

The outer conductor plate 10 is an example of a first conductor plate and is disposed outside of the inner conductor plate 20 so as to be apart therefrom with a distance between both plates. The outer conductor plate 10 may have an outer profile including a U-shaped portion, specifically a U-shaped portion 14 in the embodiment shown in FIG. 1. The outer profile of the outer conductor plate 10 may be formed in another shape, such as an H-shape, so long as the outer profile includes a U-shape portion. The U-shaped portion 14 is an example of a first U-shaped portion and is disposed outside of a U-shaped portion 24 of the inner conductor plate 20 so as to be apart therefrom with a distance between both U-shaped portions. In the embodiment shown in FIG. 1, the U-shaped portion 14 is formed in a three-dimensional U-shape opening toward both sides of the Y-axis direction and toward the negative side of the Z-axis direction such that the slot 30 opens toward the positive side of the Z-axis direction so as to have a narrower opening area than the opening on the negative side of the Z-axis direction.

In the embodiment shown in FIG. 1, the U-shaped portion 14 is a conductive member, which is formed in a U-shape so as to include a side portion 11, a side portion 12 opposed to the side portion 11 in the X-axis direction, and the front portion 13 connected between the side portion 11 and the side portion 12. Each of the side portion 11, the side portion 12 and the front portion 13 is a conductive plate or conductive film. The side portion 11 is an example of a first side portion. The side portion 12 is an example of a second side portion. The front portion 13 is an example of a first front portion.

The inner conductor plate 20 is an example of a second conductor plate and disposed in the outer conductor plate 10 so as to be apart therefrom with a distance between both plates. The inner conductor plate 20 may have an outer profile including a U-shaped portion, specifically the U-shaped portion 24 in the embodiment shown in FIG. 1. The outer profile of the inner conductor plate 20 may be formed in another shape, such as an H-shape, so long as the inner profile includes a U-shape portion. The U-shaped portion 24 is an example of a second U-shaped portion and is disposed inside of the U-shaped portion 14 of the outer conductor plate 10 so as to be apart therefrom with a distance between both U-shaped portions. In the embodiment shown in FIG. 1, the U-shaped portion 24 is formed in a three-dimensional U-shape opening toward both sides of the Y-axis direction and toward the negative side of the Z-axis direction. It should be noted that the wording "in" in the embodiment shown in FIG. 1 means the negative side of the Z-axis direction.

In the embodiment shown in FIG. 1, the U-shaped portion 24 is a conductive member, which is formed in a U-shape so as to include a side portion 21, a side portion 22 opposed to the side portion 21 in the X-axis direction, and the front portion 23 connected between the side portion 21 and the side portion 22. The front portion 23 is opposed to the front portion 13 in the Z-axis direction. Each of the side portion 21, the side portion 22 and the front portion 23 is a conductive plate or conductive film. The side portion 21 is an example of a third side portion. The side portion 22 is an example of a fourth side portion. The front portion 23 is an example of a second front portion.

The front portion 13 has the slot 30 formed therein so as to divide at least one area of the front portion 13 into a surface portion 15 and a surface portion 16. The slot 30 is an opening, which is formed in an area of the U-shaped portion 14 corresponding to a bottom of its U-shape. The surface portion 15 is an example of a first surface portion, specifically a conductive area positioning on the positive side of the Y-axis direction with respect to the slot 30 in the embodiment shown in FIG. 1. The surface portion 16 is an example of a second area, specifically a conductive area positioning on the negative side of the Y-axis direction with respect to the slot 30 in the embodiment shown in FIG. 1. The surface portion 15 has a feeding point 41 while the surface portion 16 has a feeding point 42.

The feeding points 41 and 42 are paired points, which may be electrically connected to a feeding line, such as a coaxial cable or a planar waveguide (not shown in FIG. 1 and will be described later). The feeding point 41 is an example of a first feeding point and may be electrically connected to, e.g., a grounding portion of the feeding line. The feeding point 42 is an example of a second feeding point and may be electrically connected to, e.g., a signal line of the feeding line. Or the feeding point 41 may be electrically connected to, e.g., the signal line of the feeding line. In this case, the feeding point 42 may be electrically connected to the grounding portion of the feeding line.

The antenna 101 is thus configured such that the outer conductor plate 10 serves as a radiator for radiating a radio wave while the inner conductor plate 20 serves as a reflector for reflecting a radio wave radiated from the outer conductor plate 10. Compared with an unshown antenna having a reflector or a director disposed outside of a radiator, the antenna achieves a size reduction since the inner conductor plate 20 serving as a reflector is disposed inside of the outer conductor plate 10 serving as the radiator. The side portions 11 and 12 extend in pair from both ends of the front portion 13 with the slot 30 formed therein, such that a radio wave (beam) is allowed to be radiated from the outer conductor plate 10 in a wide angle.

The U-shaped portion 14 of the outer conductive pale 10 is advantageously formed in a symmetrical shape with respect to the YZ-plane in terms of providing the antenna 101 with a wider directivity and stabilizing the antenna gain over a wide angle range. The U-shaped portion 24 of the inner conductive pale 20 is advantageously formed in a symmetrical shape with respect to the YZ-plane in terms of providing the antenna 101 with a wider directivity and stabilizing the antenna gain over a wide angle range. It is more advantageous in terms of providing the antenna 101 with a wider directivity and stabilizing the antenna gain over a wide angle range that the U-shaped portion 14 and the U-shaped portion 24 are combined with the distance between both U-shaped portions so as to be formed in a symmetrical shape with respect to the YZ-plane as a whole as exemplified in FIG. 1. The U-shaped portion 14 and the U-shaped portion 24 are advantageously configured to be formed in similar shapes to each other in terms of providing the antenna 101 with a wider directivity and stabilizing the antenna gain over a wide angle range.

The edge 17 as the boundary between the front portion 13 and the side portion 11 is an example of a first side between the first front portion and the first side portion. In the embodiment shown in FIG. 1, the side portion 11 may be bent at the edge 17 with respect to the front portion 13. The edge 18 as the boundary between the front portion 13 and the side portion 12 is an example of a second side between the first front portion and the first side portion. In the embodiment shown in FIG. 1, the side portion 12 may be bent at the edge 18 with respect to the front portion 13.

An edge 27 as the boundary between the front portion 23 and the side portion 21 is an example of a third side between the second front portion and the third side portion. In the embodiment shown in FIG. 1, the side portion 21 may be bent at the edge 27 with respect to the front portion 23. An edge 28 as the boundary between the front portion 23 and the side portion 22 is an example of a fourth side between the second front portion and the fourth side portion. In the embodiment shown in FIG. 1, the side portion 22 may be bent at the edge 28 with respect to the front portion 23.

Each of the edge 17 and the edge 18 may include at least one line segment. This arrangement provides the antenna 101 with a wider directivity. In the embodiment shown in FIG. 1, the edge 17 is one line segment extending from an upper end 10*a* of the outer conductor plate 10 to a lower end 10*b* of the outer conductor plate 10 while the edge 18 is another line segment extending from the upper end 10*a* of the outer conductor plate 10 to the lower end 10*b* of the outer conductor plate 10. Each of the edge 17 and the edge 18 may be bent at one or plural positions so as to include plural line segments or include only a curved line.

In the embodiment shown in FIG. 1, the edge 17 and the edge 18 may have line segments substantially in parallel with each other, respectively. This arrangement provides the antenna with a wider directivity. It is not essential that the edge 17 and the edge 18 have line segments substantially in parallel with each other, respectively. For example, even when the front portion 13 is formed in a trapezoidal shape (trapezoidal shape having the upper end 10*a* and the lower end 10*b* extending in parallel with each other) as seen in a front view of the outer conductor plate 10, the antenna 101 is provided with a wider directivity.

In the embodiment shown in FIG. 1, the slot 30 extends in a direction intersecting both of the edge 17 and the edge 18, respectively. This arrangement allows the antenna 101 to have an increased antenna gain in the transmission/reception of a radio wave having a polarization plane perpendicular to the extension direction (longitudinal direction) of the slot 10. When the slot 30 extends in a direction substantially perpendicular to both of the edge 17 and the edge 18, the antenna gain has a significantly increased antenna gain.

In the embodiment shown in FIG. 1, the front portion 13 may be substantially orthogonal to both of the side portion 11 and the side portion 12. This arrangement allows the antennal 101 to have a wider directivity on a plane substantially orthogonal to all of the front portion 13, the side portion 11 and the side portion 12 (the ZX-plane in this embodiment). Even when the front portion 13 is substantially orthogonal to only one of the side portion 11 and the side portion 12, the antenna 101 can achieve a wider directivity. Or even when the front portion 13 is not substantially orthogonal to both of the side portion 11 and the side portion 12, the antenna 101 can achieve a wide directivity.

In the embodiment shown in FIG. 1, the front portion 23 may be substantially in parallel with the front portion 13. This arrangement facilitates the designing of the directivity pattern of the antennal 101. Even when the front portion 23 is not substantially in parallel with the front portion 13, the antenna 101 can achieve a wide directivity.

In the embodiment shown in FIG. 1, the front portion 23 may be substantially orthogonal to both of the side portion 21 and the side portion 22. This arrangement allows the antennal 101 to have a significantly wider directivity on a plane substantially orthogonal to all of the front portion 23, the side portion 21 and the side portion 22 (the ZX-plane in this embodiment). Even when the front portion 23 is substantially orthogonal to only one of the side portion 21 and the side portion 22, the antenna 101 can achieve a wide directivity. Or even when the front portion 23 is not substantially orthogonal to both of the side portion 21 and the side portion 22, the antenna 101 can achieve a wide directivity.

In the embodiment shown in FIG. 1, the side portion 11 may be substantially in parallel with the side portion 21 opposed to the side portion 11 while the side portion 12 may be substantially in parallel with the side portion 22 opposed to the side portion 12. This arrangement facilitates the designing of the directivity pattern of the antennal 101. Even when the side portion 11 is not substantially in parallel with the side portion 21, the antenna 101 can achieve a wide directivity. Even when the side portion 12 is not substantially in parallel with the side portion 22, the antenna 101 can achieve a wide directivity.

It is assumed in FIG. 1 that the outer conductor plate 10 has a size $L_1$ in a direction substantially orthogonal to the longitudinal direction of the slot 30, and that the inner conductor plate 20 has a size $L_2$ in a direction substantially orthogonal to the longitudinal direction of the slot 30. In this case, $L_2$ may be preferably at least 0.75 times and at most 1.5 times as long as $L_1$, more preferably at least 0.9 times and at most 1.25 times as long as $L_1$ in terms of easily achieving a size reduction of the antenna 101 and a wide directivity. When $L_2$ is less than 0.75 times as long as $L_1$, the antenna 101 may have a reduced antenna gain because of a reduction in the surface area of the inner conductor plate 20 reflecting a radio wave radiated from the outer conductor plate 10. When $L_2$ is longer than 1.5 time as long as $L_1$, it is difficult to reduce the antenna 101 in size because of an increase in the area where the inner conductor plate 20 protrudes from the outer conductor plate 10 as seen in a side view of the outer conductor plate 10. Although a size reduction of the antenna 101 and an increase in antenna gain are in a trade-off relationship, the antenna 101 can be configured to achieve both advantages according to certain specifications.

The inner conductor plate 20 may have a portion protruding from the outer conductor plate 10 as seen in a side view of the outer conductor plate 10. The portion protruding from the outer conductor plate 10 may be a portion protruding toward the negative side of the Z-axis direction or in the Y-axis direction. By this arrangement, the surface area of the inner conductor plate 20, which reflects a radio wave radiated from the outer conductor plate 10, can be enlarged to increase the antenna gain of the antenna 101, although it is difficult to reduce the antenna 101 in size.

Or the outer conductor plate 10 may entirely overlaps with the inner conductor plate 20 as seen in a side view of the outer conductor plate 10. This arrangement can reduce the antenna 101 in size because the inner conductor plate 20 does not protrude from the outer conductor plate 10 as seen in a side view of the outer conductor plate 10.

The slot 30 may extend so as to reach both of the side portion 11 and the side portion 12 for input impedance matching in the antenna 101. In the embodiment shown in FIG. 1, the slot 30 has the slot end 31 and the slot end 32, which contact the side portion 11 at the edge 17 and the side portion 12 at the edge 18, respectively. Even when the slot 30 does not reach one or any of the side portion 11 and the side portion 12, the antenna 101 can have a wide directivity. In this case, one or both of the slot end 31 and the slot end 32 are positioned in the front portion 13. Or even when the slot 30 extends so as to enter one or both of the side portion 11 and the side portion 12, the antenna 101 can have a wide directivity. In this case, the slot end 31 may be positioned in the side portion 11 while the slot end 32 may be positioned in the side portion 12. Even when the slot 30 extends so as to reach the edge of one or both of the side portion 11 and the side portion 12, the antenna 101 can have a wide directivity. In this case, the slot end 31 may be positioned on an edge of the side portion 11 (e.g., an edge opposite to the edge 17) while the slot end 32 may be positioned on an edge of the side portion 12 (e.g., an edge opposite to the edge 18).

In the embodiment shown in FIG. 1, the feeding points 41 and 42 are disposed in the vicinity of a central portion 35 of the slot 30. This arrangement allows the antenna 101 to have a wider directivity in comparison with an arrangement where the feeding points 41 and 42 are disposed away from the central portion 35. The slot 30 may have a pair of longitudinal sides 33 and 34 extending in the longitudinal direction. When the feeding point 41 is disposed at a position of the longitudinal side 33 in the vicinity of the central portion 35 while the feeding point 42 is disposed at a position of the longitudinal side 34 in the vicinity of the central portion 35, the antenna 101 can have a wide directivity. In the embodiment shown in FIG. 1, the central portion 35 may include a middle point in the longitudinal direction of the slot 30 extending from the slot end 31 to the slot end 32. When it is assumed that there is an imaginary line extending from the middle point in a direction substantially orthogonal to the longitudinal direction of the slot 30 and in parallel with the front portion 13, the vicinity of the central portion 35 means a position in the vicinity of the intersection of the imaginary line and the longitudinal side 33 and in the vicinity of the intersection of the imaginary line and the longitudinal side 34. When it is assumed that the entire length of the slot 30 in the longitudinal direction is defined as 100%, the vicinity of the central portion 35 may range from 40% to 60% or from 45% to 55% of the entire length in a direction away from the slot end 31 (toward the slot 32).

In the embodiment shown in FIG. 1, the front portion 13 may be formed in a substantially rectangular shape as seen in a front view of the outer conductor plate 10 while the slot 30 may be formed in a substantially oblong shape as seen in a front view of the outer conductor plate 10. In the outer conductor plate 10 having such a shape, it is assumed that the surface portion 15 has a size $W_1$ in a direction substantially orthogonal to the longitudinal direction of the slot 30, and that the surface portion 16 has a size $W_2$ in a direction substantially orthogonal to the longitudinal direction of the slot 30. In this case, $W_2$ may be at least 0.1 times and at most 10 times as long as $W_1$, preferably at least 0.2 times and at most 9.0 times as long as $W_1$ and more preferably at least 0.3 times and at most 8.0 times as long as $W_1$. When $W_2$ is at least 0.1 times and at most 10 times as long as $W_1$, the antenna 101 can have a wider directivity.

It is assumed that the front portion 13 is in a substantially rectangular shape as seen in a front view of the outer conductor plate 10, that the outer conducive plate 10 has a size $L_1$ in a direction substantially orthogonal to the longitudinal direction of the slot 30, and that the antenna 101 transmits and receives a radio wave having an effective wavelength $\lambda_g$ in a dielectric substance. In this case, $L_1$ may be at least $0.1\times\lambda g$ and at most $0.6\times\lambda g$, preferably at least $0.15\times\lambda g$ and at most $0.55\times\lambda g$, more preferably at least $0.20\times\lambda g$ and at most $0.50\times\lambda g$. When $L_1$ is at least $0.1\times\lambda g$ and at most $0.6\times\lambda g$, the antenna 101 can achieve not only a wide directivity but also a size reduction.

The effective wavelength $\lambda g$ represents a wavelength obtained in consideration of an effect by the dielectric constant in an area surrounding the antenna 101 and a dielectric substance in the antenna (e.g., a casing or a substrate).

In FIG. 2, it is assumed that the distance between the side portion 11 and the side portion 12 opposed to the side portion 11 is $d_1$, that the distance between the side portion 12 and the side portion 22 opposed to the side portion 12 is $d_2$, and that the antenna 101 transmits and receives a radio wave having an effective wavelength $\lambda_g$ in a dielectric substance. In this case, at least one of $d_1$ or $d_2$ may be at least $0.05\times\lambda_g$ and at most $0.5\times\lambda_g$, preferably at least $0.07\times\lambda_g$ and at most $0.4\times\lambda_g$, more preferably at least $0.09\times\lambda_g$ and at most $0.3\times\lambda_g$. When at least one of $d_1$ or $d_2$ is at least $0.05\times\lambda_g$ and at most $0.5\times\lambda_g$, the antenna 101 can achieve not only a wide directivity but also a size reduction. Both of $d_1$ and $d_2$ may be at least $0.05\times\lambda_g$ and at most $0.5\times\lambda_g$, preferably at least $0.07\times\lambda_g$ and at most $0.4\times\lambda_g$, more preferably at least $0.09\times\lambda_g$ and at most $0.3\times\lambda_g$.

In FIG. 2, it is assumed that the distance between the front portion 13 and the front portion 23 is $d_3$, and that the antenna 101 transmits and receives a radio wave having an effective wavelength $\lambda_g$ in a dielectric substance. In this case, $d_3$ may be larger than 0 and at most $0.3\times\lambda_g$, preferably at least $0.02\times\lambda_g$ and at most $0.28\times\lambda_g$, more preferably at least $0.04\times\lambda_g$ and at most $0.26\times\lambda_g$. When $d_3$ may be larger than 0 and at most $0.3\times\lambda_g$, the antenna 101 can have a wide directivity.

Figure 3:
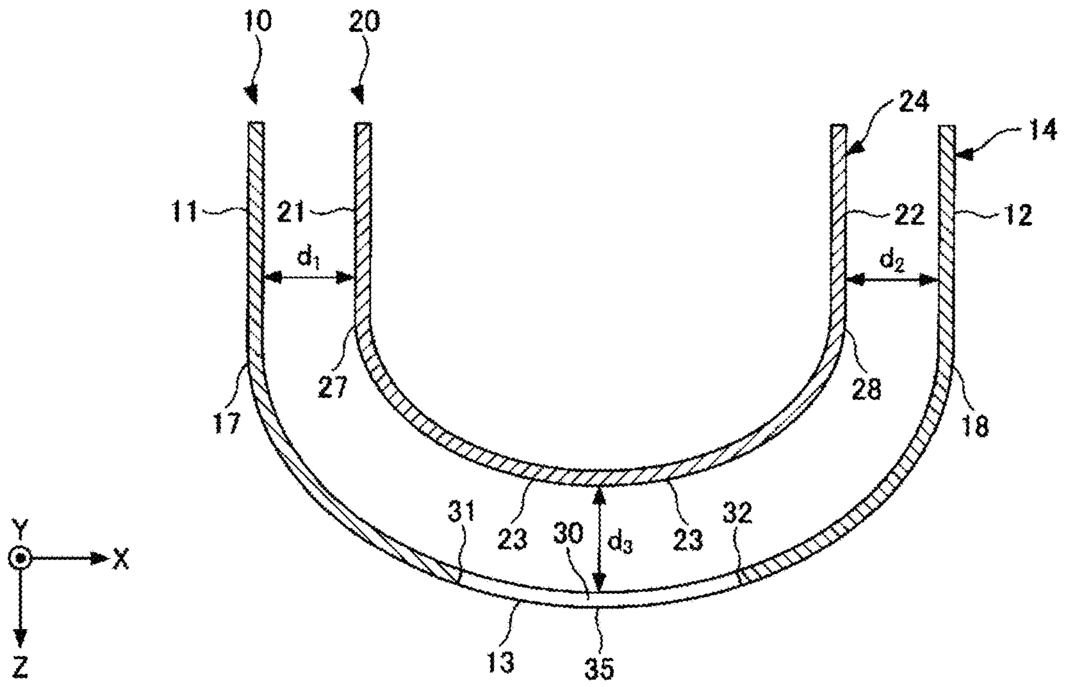
FIG. 3 is a cross-sectional view illustrating a first modification of the antenna according to the first embodiment in the ZX-plane.

FIG. 3 is a cross-sectional view illustrating a first modification of the antenna according to the first embodiment in the ZX-plane. Even when only one of the front portion 13 and the front portion 23 has a curved portion, the antenna 101 can have a wide directivity. In this modification, both of the front portion 13 and the front portion 23 may preferably have curved portions as shown in FIG. 3, which allows the antenna 101 to have a wider directivity in comparison with a mode where only one of the front portions has a curved portion.

Figure 4:
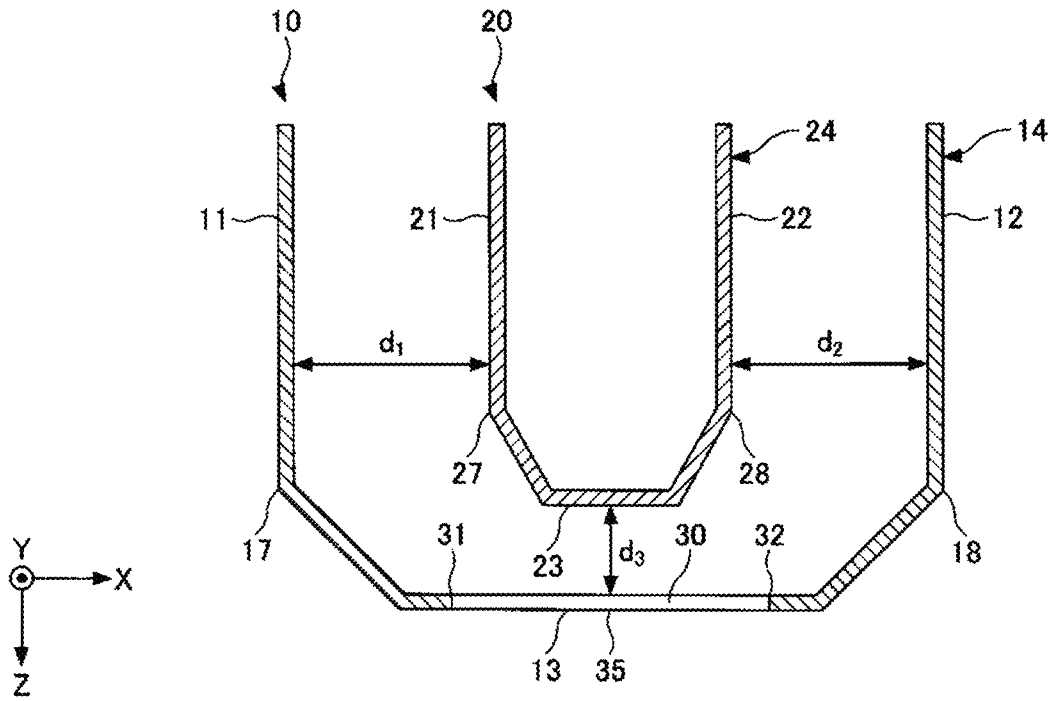
FIG. 4 is a cross-sectional view illustrating a second modification of the antenna according to the first embodiment in the ZX-plane.

FIG. 4 is a cross-sectional view illustrating a second modification of the antenna according to the first embodiment in the ZX-plane. Even when one of the front portion 13 and the front portion 23 has a plurality of planar portions, the antenna 101 can have a wide directivity. In this modification, both of the front portion 13 and the front portion 23 may preferably have a plurality of planar portions, which allows the antenna 101 to have a wider directivity in comparison with a mode where only one of the front portions has a plurality of planar portions. In the modification shown in FIG. 4, each of the front portion 13 and the front portion 23 includes three planar portions.

In the modifications shown in FIG. 3 and FIG. 4, each of the side portion 11 and the side portion 12 is shown to be formed in a two-dimension planar shape. Even when at least one of the side portion 11 or the side portion 12 has a curved portion, the antenna 101 can have a wide directivity. Likewise, each of the side portion 21 and the side portion 22 is shown to be formed in a two-dimension planar shape. Even when at least one of the side portion 21 or the side portion 22 has a curved portion, the antenna 101 can have a wide directivity.

Figure 5:
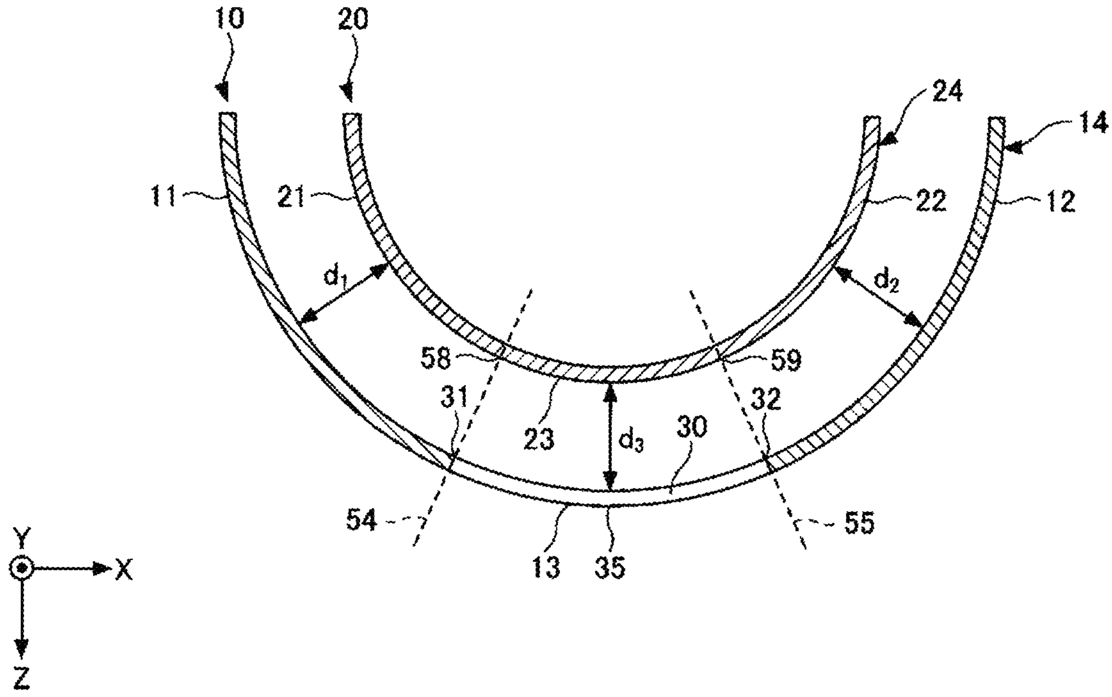
FIG. 5 is a cross-sectional view illustrating a third modification of the antenna according to the first embodiment in the ZX-plane.

FIG. 5 is a cross-sectional view illustrating a third modification of the antenna according to the first embodiment in the ZX-plane. Even when one of the U-shaped portion 14 and the U-shaped portion 24 may be formed in an arc shape, the antenna 101 can have a wide directivity. In this modification, each of the U-shaped portion 14 and the U-shaped portion 24 may be preferably formed in an arc shape, which allows the antenna 101 to have a wider directivity in comparison with a mode where only one of the U-shaped portions is formed in an arc shape.

When the U-shaped portion 14 is formed in an arc shape, the front portion 13 may be defined to be, e.g., an arc portion formed so as to extend from the slot end 31 to the slot end 32 in the U-shaped portion 14 as seen in a front view of the U-shaped portion 14 (point of view seen from the Y-axis direction). The side portion 11 may be defined to be, e.g., an arc portion formed so as to extend in a direction opposite to the front portion 13 with respect to the slot end 31 in the U-shaped portion 14 as seen in the front view of the U-shaped portion 14. The side portion 12 may be defined to be an arc portion formed so as to extend in a direction opposite to the front portion 13 with respect to the slot end 32 in the U-shaped portion 14 as seen in the front view of the U-shaped portion 14.

When the U-shaped portion 24 is formed in an arc shape, the front portion 23 may be defined to be, e.g., an arc portion formed so as to extend from an intersection 58 to an intersection 59 in the U-shaped portion 24 as seen in a front view of the U-shaped portion 24 (point of view seen from the Y-axis direction). The intersection 58 is a point where the U-shaped portion 24 intersects with an imaginary straight line 54 orthogonal to the tangent passing through the slot end 31. The intersection 59 is a point where the U-shaped portion 24 intersects with an imaginary straight line 55 orthogonal to the tangent passing through the slot end 32. The side portion 21 may be defined to be an arc portion formed so as to extend in a direction opposite to the front portion 23 with respect to the intersection 58 in the U-shaped portion 24 as seen in the front view of the U-shaped portion 24. The side portion 22 may be defined to be an arc portion formed so as to extend in a direction opposite to the front portion 23 with respect to the intersection 59 in the U-shaped portion 24 as seen in the front view of the U-shaped portion 24.

Figure 6:
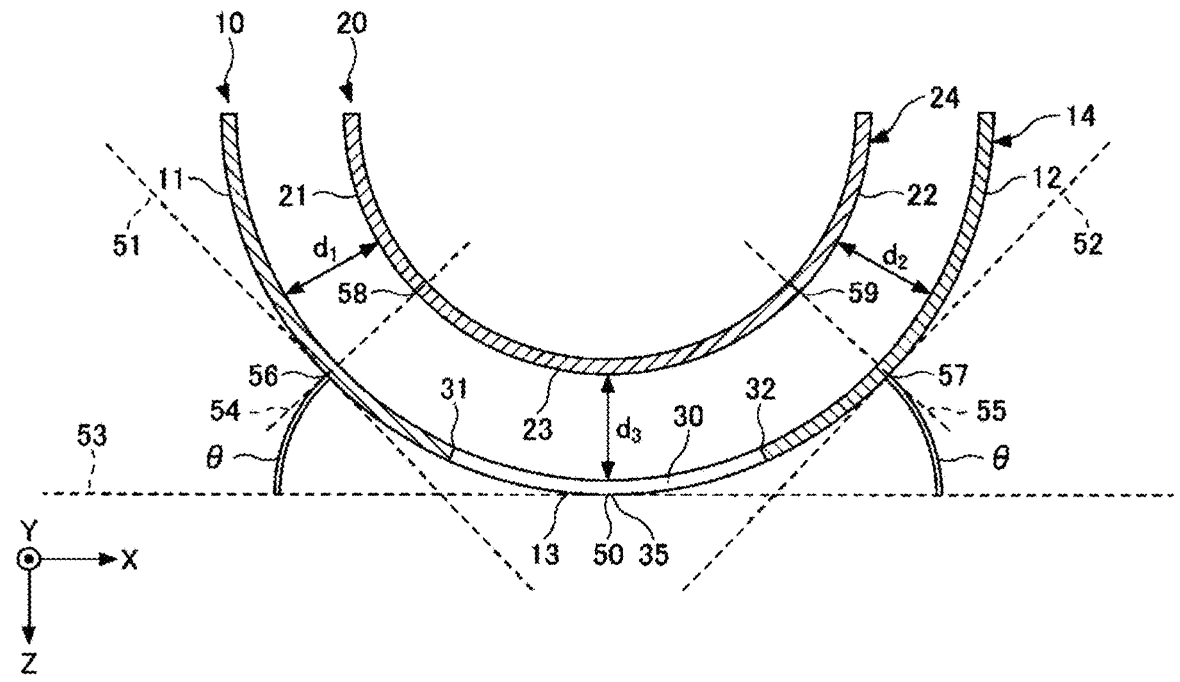
FIG. 6 is a cross-sectional view illustrating the third modification of the antenna according to the first embodiment in the ZX-plane.

FIG. 6 is a cross-sectional view illustrating the third modification of the antenna according to the first embodiment in the ZX-plane an in FIG. 5. When this modification has a U-shaped portion 14 formed in an arc shape, this modification may have a front portion 13, a side portion 11 and a side portion 12 defined so as to be different from the definitions of the front portion, the side portion and the side portion of the second modification. It is assumed that each of the tangent 51 at a point of contact 56 of the U-shaped portion 14, and the tangent 53 at a point of contact 57 of the U-shaped portion 14 crosses at angle θ with the tangent 53 having the bottom 50 of the U-shaped portion 14 as a point of contact. In this case, the front portion 13 may be defined to be an arc portion formed so as to extend from the point of contact 56 to the point of contact 57 in the U-shaped portion 14, wherein both points of contact have an angle θ ranging from at least 0° and at most 45° (in absolute value) as seen in a front view of the U-shaped portion 14 as seen in a front view of the U-shaped portion 14. The side portion 11 may be defined to be an arc portion formed so as to extend in a direction opposite to the front portion 13 with respect to the point of contact 56 in the U-shaped portion 14 as seen in a front view of the U-shaped portion 14. The side portion 12 may be defined to be an arc portion formed so as to extend in a direction opposite to the front portion 13 with respect to the point of contact 57 in the U-shaped portion 14 as seen in a front view of the U-shaped portion 14.

When the U-shaped portion 24 is formed in an arc shape, the front portion 23 may be defined to be an arc portion formed so as to extend from an intersection 58 to an intersection 59 in the U-shaped portion 24 as seen in a front view of the U-shaped portion 24. The intersection 58 is a point where the U-shaped portion 24 intersects with an imaginary straight line 54 orthogonal to the tangent passing through the point of contact 56. The intersection 59 is a point where the U-shaped portion 24 intersects with an imaginary straight line 55 orthogonal to the tangent passing through the point of contact 57. The side portion 21 may be defined to be an arc portion formed so as to extend in a direction opposite to the front portion 23 with respect to the intersection 58 in the U-shaped portion 24 as seen in the front view of the U-shaped portion 24. The side portion 22 may be defined to be an arc portion formed so as to extend in a direction opposite to the front portion 23 with respect to the intersection 59 in the U-shaped portion 24 as seen in the front view of the U-shaped portion 24.

When the front portion 23 has a conductor face at positions where the feeding point 41 and the feeding point 42 are respectively projected as seen in a front view of the outer conductor plate 10 as shown in each of FIG. 1 to FIG. 6, the antenna 101 can have a wide directivity.

The inner conductor plate 20 may be a grounded grounding conductor or an ungrounded, parasitic conductor. The inner conductor plate can effectively function as a reflector to widen the directivity of the antenna 101.

Figure 7:
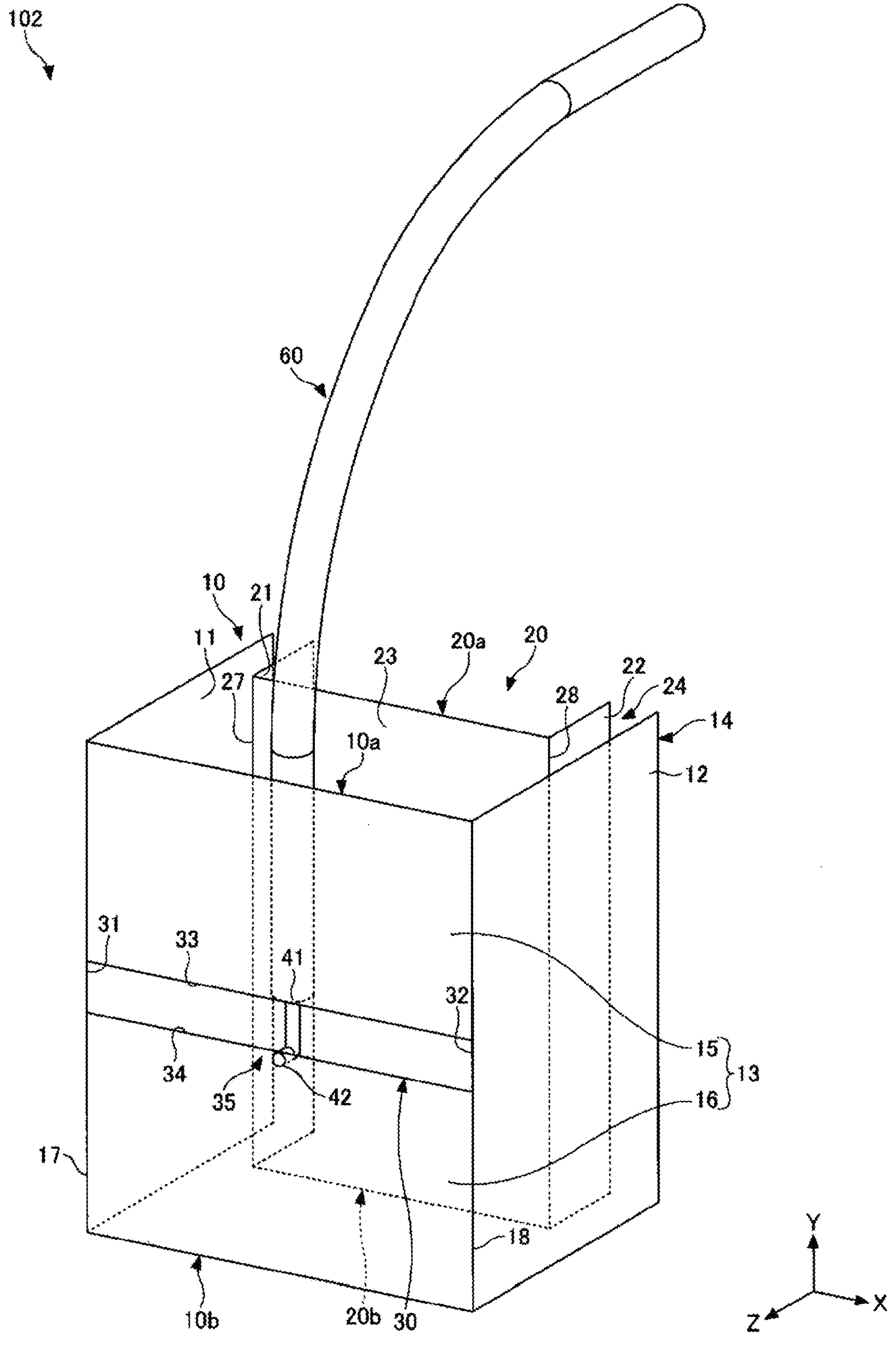
FIG. 7 is a perspective view illustrating an example of the antenna according to a second embodiment.
Figure 8:
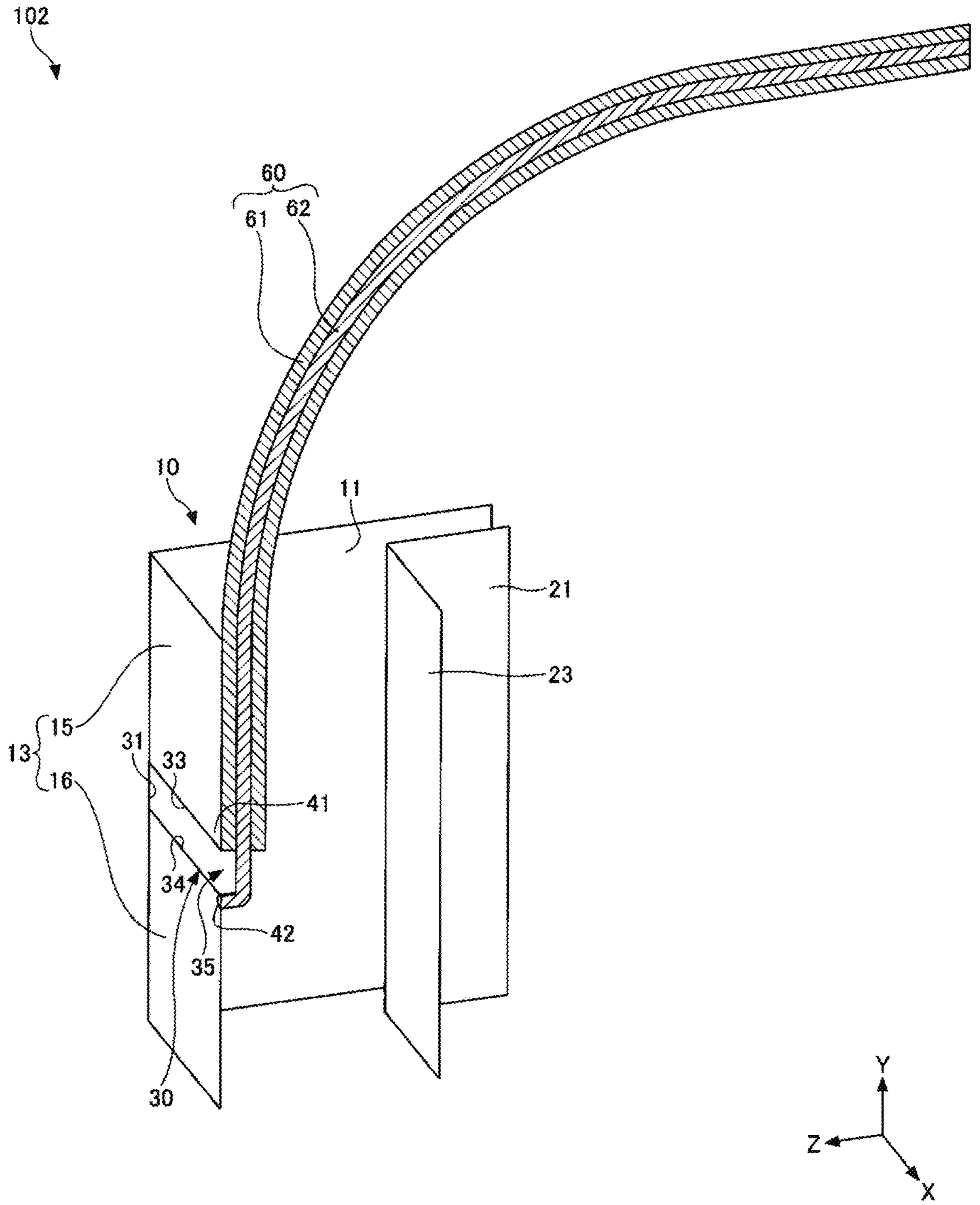
FIG. 8 is a cross-sectional view illustrating the example of the antenna according to the second embodiment.

FIG. 7 is a perspective view illustrating an example of the antenna according to a second embodiment. FIG. 8 is a cross-sectional view illustrating the example of the antenna according to the second embodiment. Regarding the second embodiment, explanation of similar elements and advantages to the above-mentioned embodiment is also applicable to the second embodiment and will be omitted.

The antenna 102 shown in FIG. 7 and FIG. 8 includes a coaxial cable 60, which may be electrically connected to a feeding point 41 and a feeding point 42. The coaxial cable 60 is an example of the feeding line. In the embodiment shown in FIGS. 7 and 8, the coaxial cable 60 may have an outer conductor 61, as a grounding portion, electrically connected to the feeding point 41, and a center conductor 62, as a signal line, electrically connected to the feeding point 42.

When the coaxial cable 60 partly passes between a front portion 13 and a front portion 23, the directivity of the antenna 102 has an increased robustness to the coaxial cable 60 in comparison with, e.g., an unshown mode where the coaxial cable 60 partly passes on the positive side of the Z direction with respect to the front portion 13. The coaxial cable 60 may have its leading edge preferably disposed so as to come into the gap between the front portion 13 and the front portion 23 from the positive side toward the negative side of the Y-axis direction or from the negative side toward the positive side of the Y-axis direction in order to widen the directivity of the antenna 102. The coaxial cable 60 may have its leading edge disposed so as to come into the gap between the side portion 11 and the front portion 21 from the negative side toward the positive side of the Z-axis direction.

The outer conductor 61 may be electrically connected to an inner surface of the surface portion 15 opposed to the front portion 23. The center conductor 62 may be electrically connected to an inner surface of the surface portion 16 opposed to the front portion 23, crossing over the slot 30 in the Y-axis direction as seen in a front view of the outer conductor plate 10.

Figure 9:
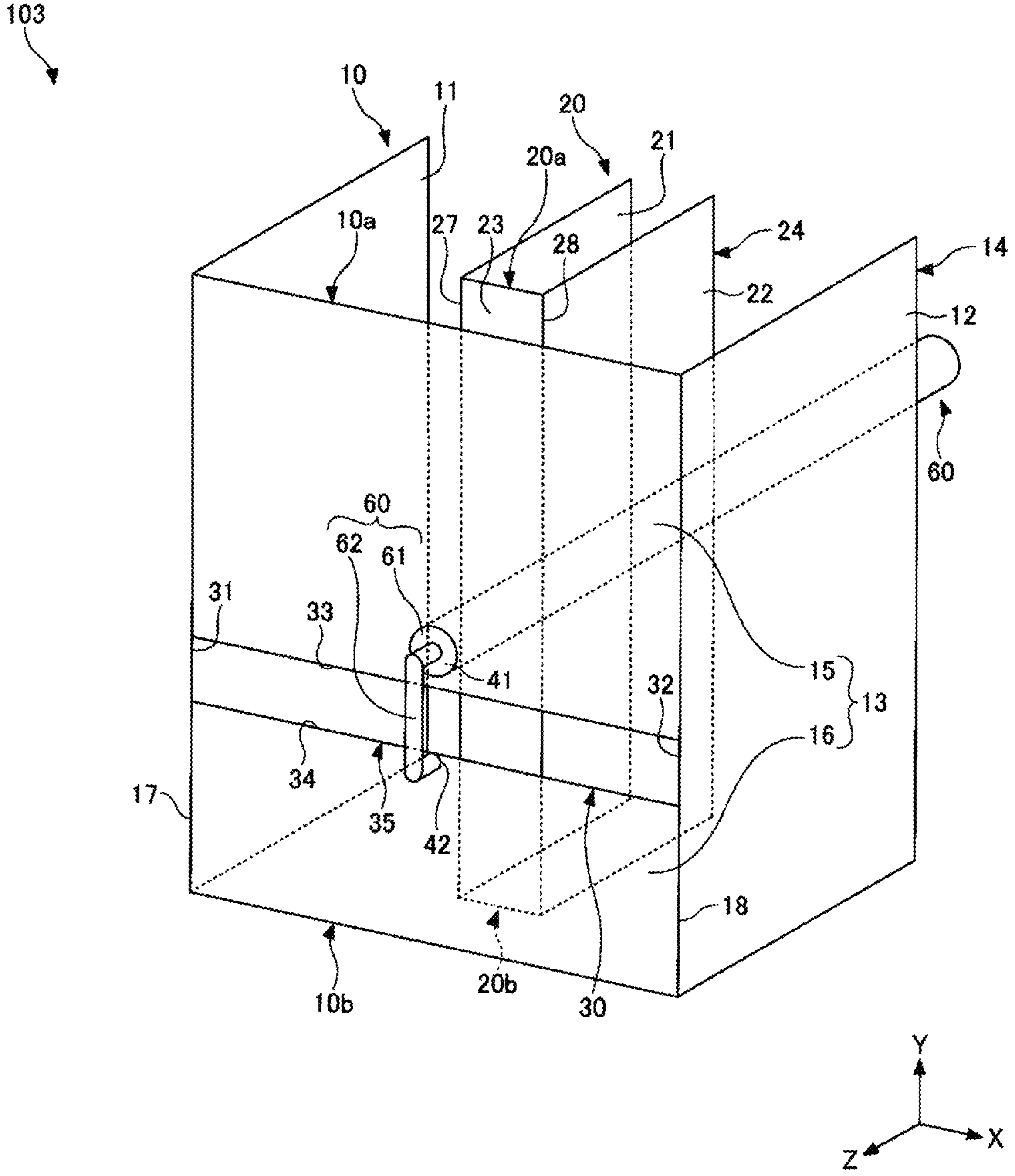
FIG. 9 is a perspective view illustrating an example of the antenna according to a third embodiment.
Figure 10:
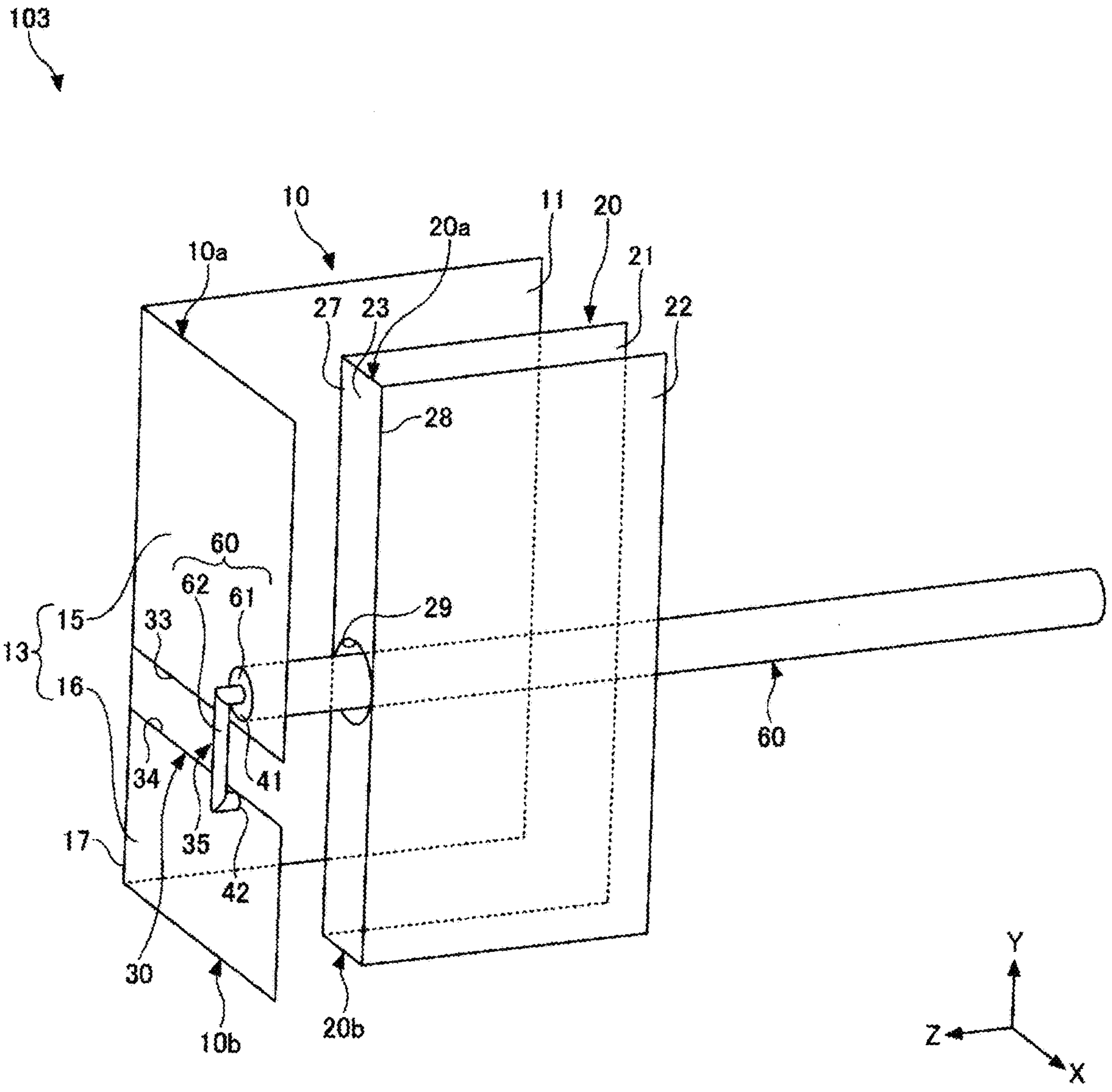
FIG. 10 is a cross-sectional view illustrating the example of the antenna according to the third embodiment.

FIG. 9 is a perspective view illustrating an example of the antenna according to a third embodiment. FIG. 10 is a cross-sectional view illustrating the example of the antenna according to the third embodiment. Regarding the third embodiment, explanation of similar elements and advantages to the above-mentioned embodiments is also applicable to the third embodiment and will be omitted.

The antenna 103 shown in FIGS. 9 and 10 includes a coaxial cable 60, which may be electrically connected to a feeding point 41 and a feeding point 42. The coaxial cable 60 is an example of the feeding line. In the embodiment shown in FIGS. 9 and 10, the coaxial cable 60 may have an outer conductor 61, as a grounding portion, electrically connected to the feeding point 41, and the coaxial cable 60 may have a center conductor 62, as a signal line, electrically connected to the feeding point 42.

The coaxial cable 60 may partly pass between a front portion 13 and a front portion 23 as in the second embodiment described above. In the embodiment shown in FIGS. 9 and 10, the front portion 23 has an opening 29 formed therein to pass the coaxial cable 60 therethrough. By passing the coaxial cable 60 through the opening 29, the coaxial cable 60 can be partly disposed inside of the inner conductor plate 20 such that the antenna 103 is less affected by the coaxial cable 60 to have a stabilized directivity.

When the opening 29 is positioned at the center of gravity of the front portion 23, the adverse effect to the antenna 103 caused by the coaxial cable 60 can be further reduced such that the directivity is further stabilized.

The coaxial cable 60 may have its leading portion brought into contact with an inner surface of the surface portion 15 opposed to the front portion 23. The outer conductor 61 may be electrically connected to the surface portion 15. The center conductor 62 may be electrically connected to an outer surface of the surface portion 16 opposite to the front portion 23, crossing over a slot 30 in the Y-axis direction as seen in a front view of the outer conductor plate 10.

Figure 11:
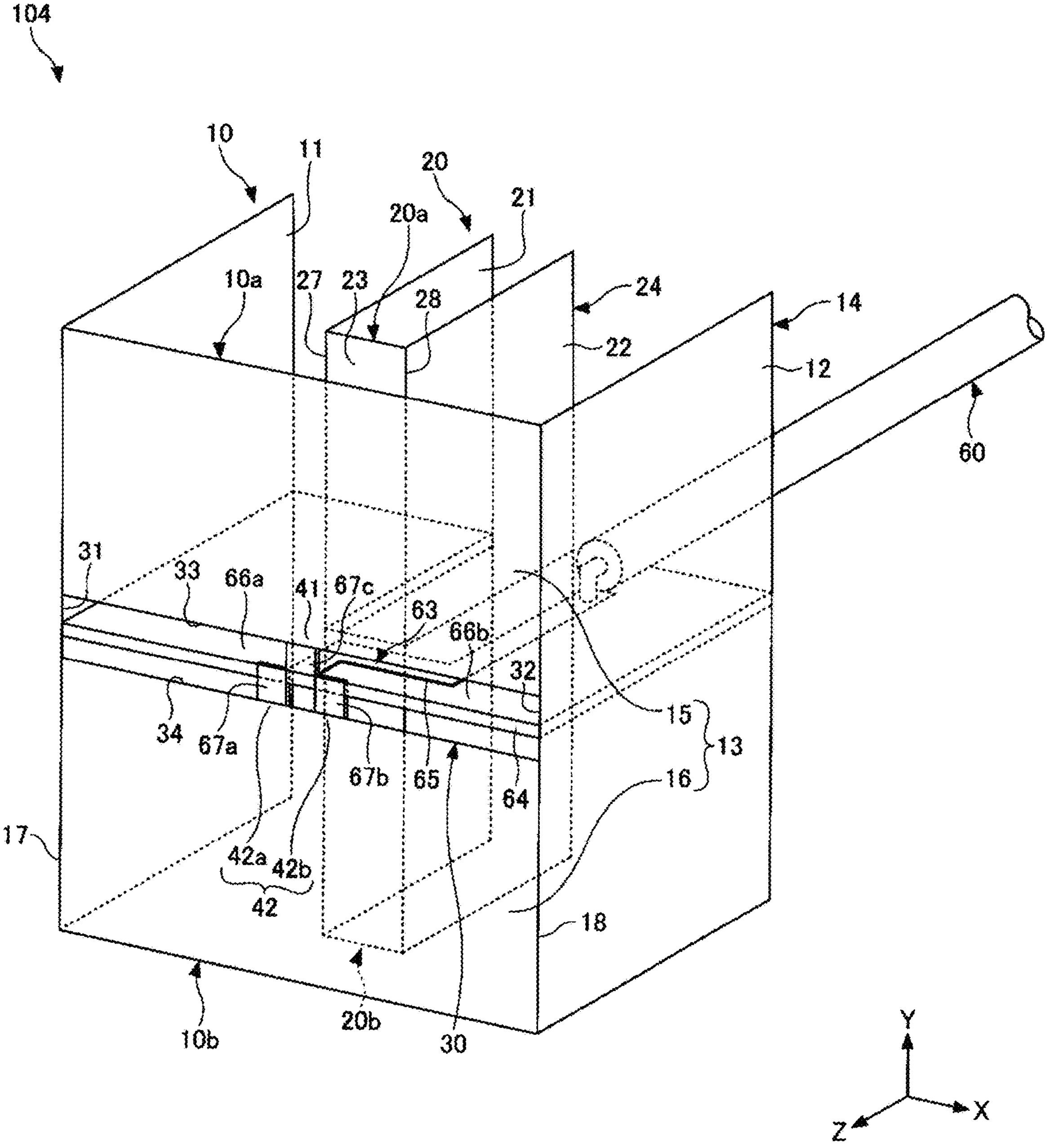
FIG. 11 is a perspective view illustrating an example of the antenna according to a fourth embodiment.
Figure 12:
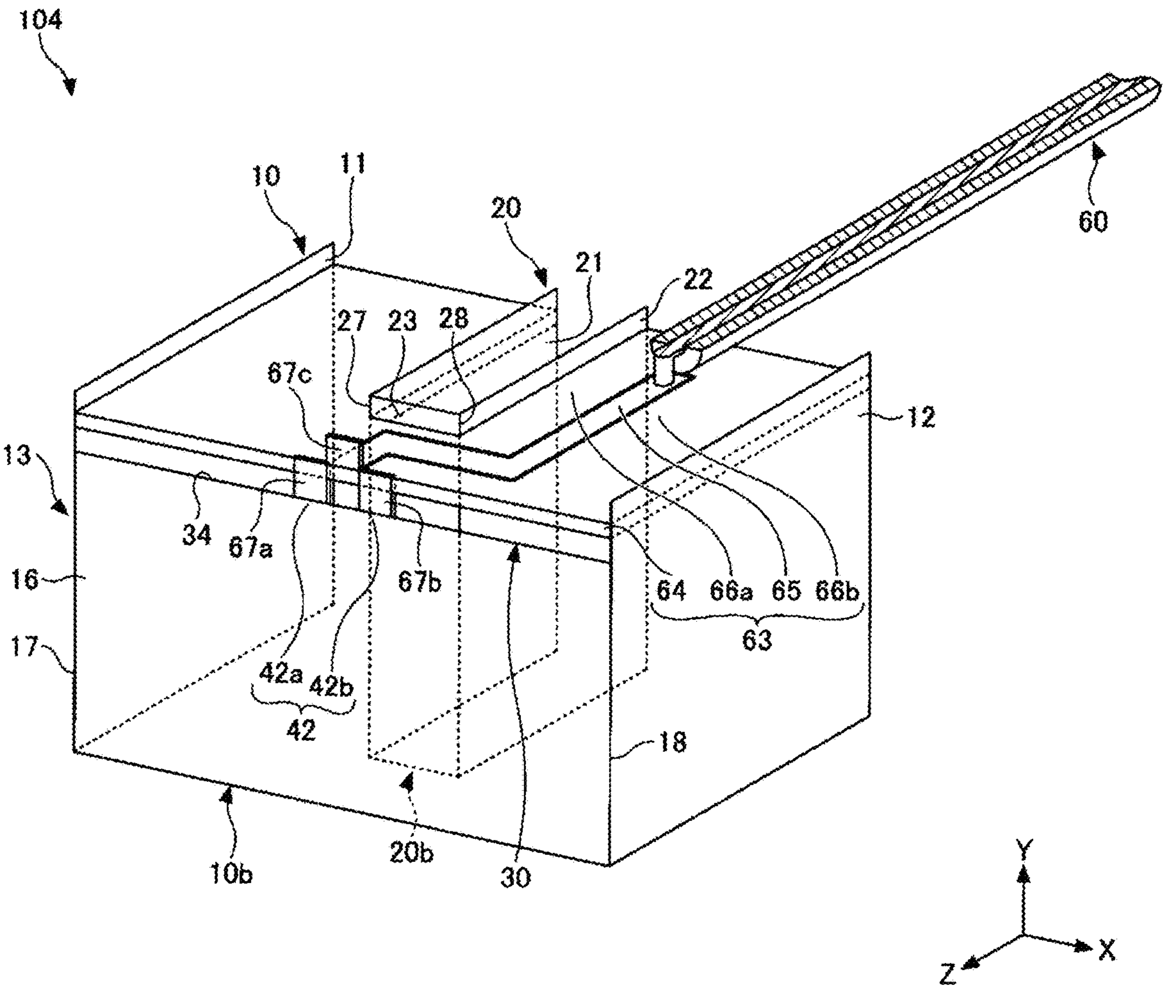
FIG. 12 is a cross-sectional view illustrating the example of the antenna according to the fourth embodiment.

FIG. 11 is a perspective view illustrating an example of the antenna according to a fourth embodiment. FIG. 12 is a cross-sectional view illustrating the example of the antenna according to the fourth embodiment. Regarding the fourth embodiment, explanation of similar elements and advantages to the above-mentioned embodiments is also applicable to the fourth embodiment and will be omitted.

The antenna 104 shown in FIGS. 11 and 12 includes a coplanar line 63, which may be electrically connected to a feeding point 41 and a feeding point 42. The coplanar line 63 is an example of the feeding line, more specifically, an example of the planar waveguide. In the embodiment shown in FIGS. 11 and 12, the coplanar line 63 may include a dielectric substrate 64, which has a strip conductor 65 and grounding planes 66*a* and 66*b*. The dielectric substrate 64 is disposed in parallel with the ZX-plane so as to be positioned between a pair of long sides 33 and 34 forming a slot 30 as seen in a front view of the outer conductor plate 10.

The strip conductor 65 is a signal line, which is disposed on a surface of the dielectric substrate 64 on the positive side of the Y-axial direction. The strip conductor 65 may have a first end electrically connected to the center conductor of a coaxial cable 60 and a second end electrically connected to the feeding point 41 via a connection conductor 67*c*. The connection conductor 67*c* is a conductive strip extending in Y-axial direction.

The grounding planes 66*a* and 66*b* are grounding portions, which are stacked on a surface of the dielectric substrate 64 on the positive side of the Y-axial direction, and which are disposed on both sides of the strip conductor 65 with gaps between the grounding planes and the strip conductor. The grounding plane 66*a* may have a first end electrically connected to the outer conductor of a coaxial cable 60, and a second end electrically connected to a first feeding point 42*a* of the feeding point 42 via a connection conductor 67*a*. The grounding planes 66*b* may have a first end electrically connected to the outer conductor of a coaxial cable 60, and a second end electrically connected to a second feeding point 42*b* of the feeding point 42 via a connection conductor 67*b*. The connection conductors 67*a* and 67*b* are conductive strips, which extend in the Y-axial direction on both sides of the X-axial direction of the connection conductor 67*c*.

The coplanar line 63 may partly extend between a front portion 13 and a front portion 23 as in the second and third embodiments mentioned above. In the embodiment shown in FIGS. 11 and 12, the dielectric substrate 64 may be a substrate formed in a U-shape, which is disposed a space between an outer conductor plate 10 and an inner conductor plate 20, and which is disposed in parallel with the ZX-plane. The inner conductor plate 20 may be a grounding conductor grounded to the grounding plane 66*a* or an ungrounded, parasitic conductor. The inner conductor plate can effectively function as a reflector to increase the directivity of the antenna 104.

It should be noted that the planar waveguide is not essential to be a coplanar waveguide but may be another transmission line, such as a microstrip line.

Figure 13:
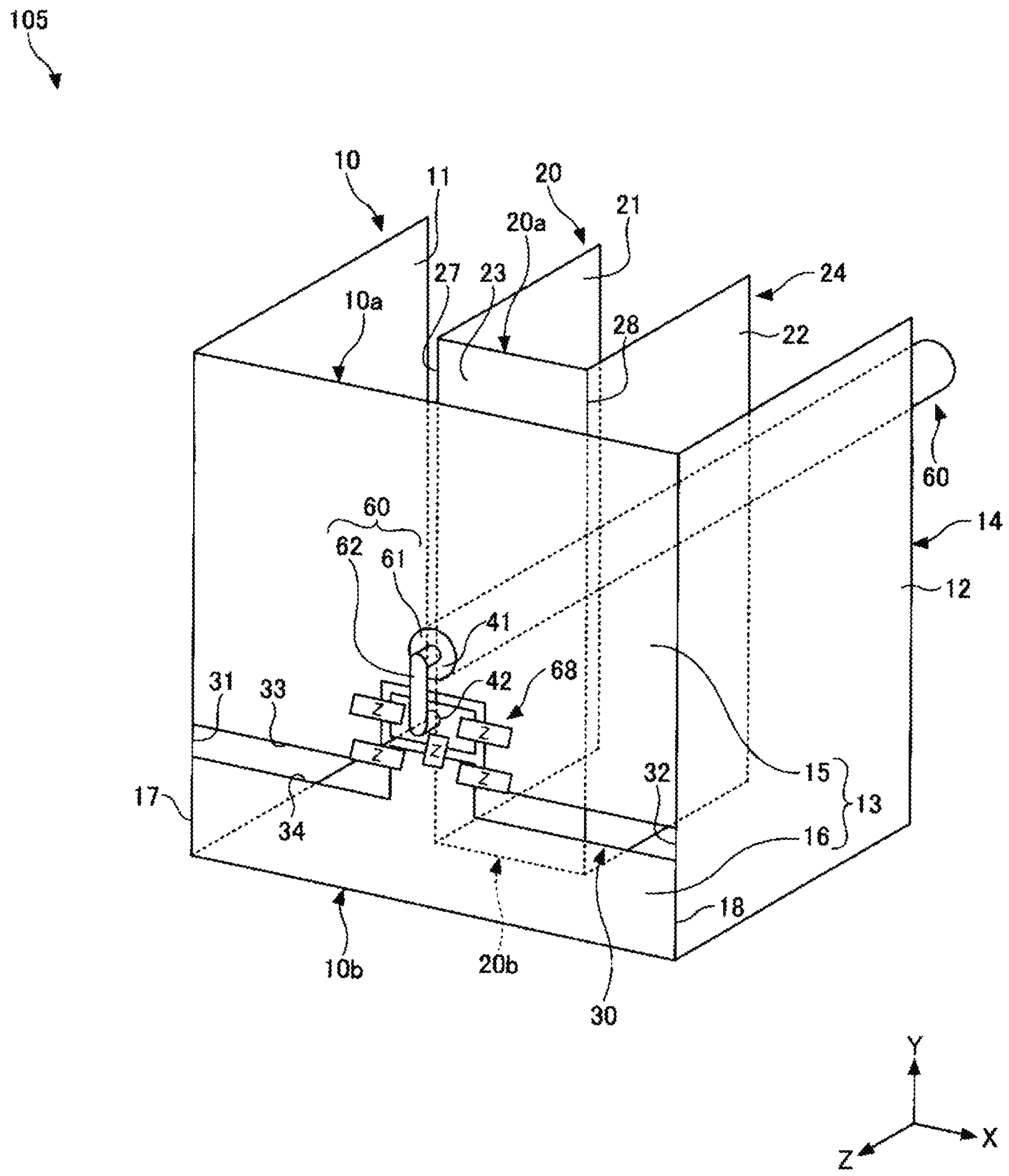
FIG. 13 is a perspective view illustrating an example of the antenna according to a fifth embodiment.

FIG. 13 is a perspective view illustrating an example of the antenna according to a fifth embodiment. Regarding the fifth embodiment, explanation of similar elements and advantages to the above-mentioned embodiments is also applicable to the fifth embodiment and will be omitted.

The antenna 105 shown in FIG. 13 may include a matching circuit 68, which matches the impedance between a feeding point 42 connected to the center conductor as a signal line of a coaxial cable 60, and a feeding point 41 connected to the outer conductor as a grounding portion of the coaxial cable 60. The matching circuit 68 includes at least one impedance element Z (such as an inductor or a capacitor). The antenna according to each of the embodiment described above may include the matching circuit 68. The antenna shown in FIG. 13 may have an unshown dielectric substrate additionally disposed on an outer side of a front portion 13 (opposite to a front portion 23). The dielectric substrate may be a PCB substrate containing an epoxy resin. For example, the antenna 105 shown in FIG. 13 may be configure such that an outer conductor plate 10 has the front portion 13 formed by a conductor disposed on a first principal surface of the PCB substrate. The PCB substrate may have an inductance element, a capacitor element or another element on a second principal surface (surface opposite to the first principal surface).

The antenna 105 shown in FIG. 13 may be configured such that the front portion 13 of the outer conductor 10 and the matching circuit 68 are both disposed on the first principal surface of the PCB substrate. It should be noted that when the PCB substrate is disposed on the outer side of the front portion 13, the front portion 13 is preferably formed in a planar shape along the XY-plane.

Figure 14:
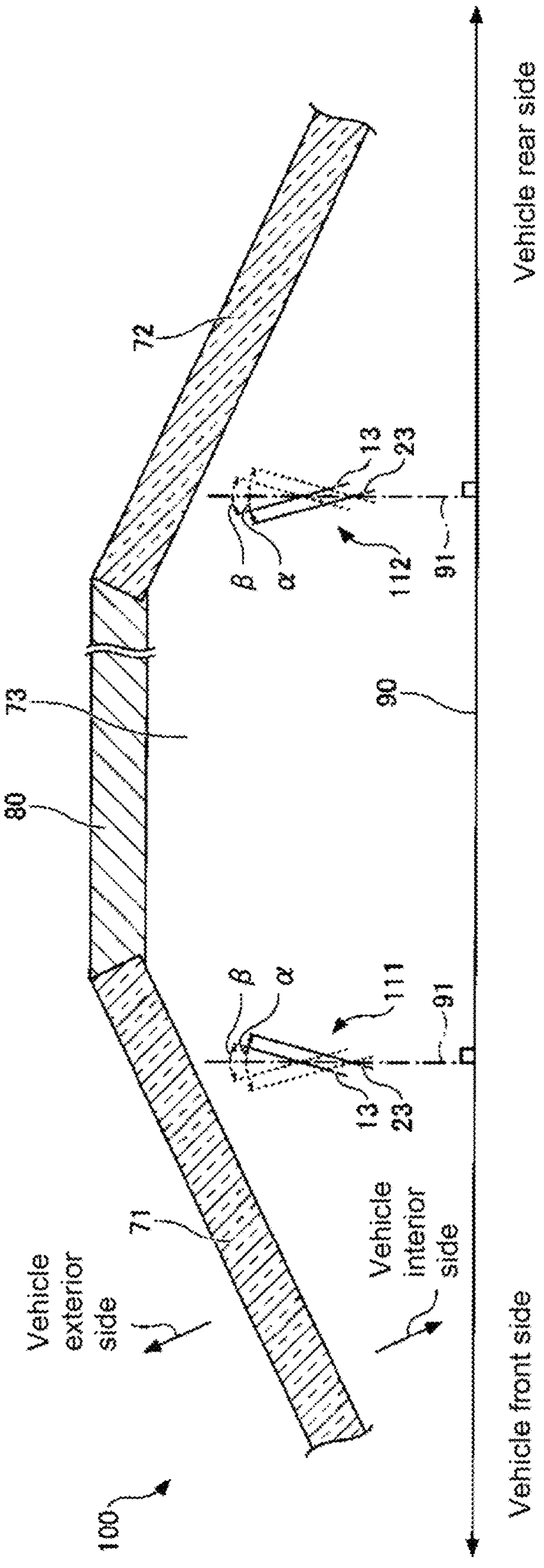
FIG. 14 is a view exemplifying how the antenna according to each embodiment is mounted to a vehicle.

FIG. 14 is a view exemplify how the antenna according to each of the embodiments is mounted to a vehicle. The antenna system 100 shown in FIG. 14 may include a front windshield 71, a rear windshield 72, a front antenna 111 disposed on the front windshield 71, and a rear antenna 112 disposed on the rear windshield 72. Each of the front windshield 71 and the rear windshield 72 is an example of a vehicle window glass. Each of the front antenna 111 and the rear antenna 112 is an example of the antenna according to each of the embodiments, such as the antenna 101.

The front antenna 111 has a front portion 13 disposed so as to be set at an inclination (inclination angle β) of preferably at most ±15° with respect to a vertical plane 91 perpendicular to a horizontal plane 90. This arrangement increases the antenna gain in a direction parallel to the horizontal plane 90 with respect to the front antenna 111 (direction toward a vehicle front side). The antenna has a side portion 11 and a side portion 12 disposed on both sides of a vehicle width direction so as to be apart from each other, increasing the antenna gain in the vehicle width direction. In contrast, when the front portion 13 of the front antenna 111 is disposed so as to be set at an inclination of more than ±15° with respect to the vertical plane 91 perpendicular to the horizontal plane 90, the antenna gain is unbalanced in the direction parallel to the horizontal plane 90, which means that the difference between the gain in a vehicle travelling direction and the gain in the vehicle width direction could increase.

Likewise, the rear antenna 112 has a front portion 13 disposed so as to be set at an inclination (inclination angle β) of preferably at most ±15° with respect to a vertical plane 91 perpendicular to the horizontal plane 90. This arrangement increases the antenna gain in a direction in parallel to the horizontal plane 90 with respect to the rear antenna 112 (direction toward a vehicle rear side). The antenna has a side portion 11 and a side portion 12 disposed on both sides of a vehicle width direction so as to be apart from each other, increasing the antenna gain in the vehicle width direction. In contrast, when the front portion 13 of the rear antenna 112 is disposed so as to be set at an inclination of more than ±15° with respect to the vertical plane 91 perpendicular to the horizontal plane 90, the antenna gain is unbalanced in the direction in parallel to the horizontal plane 90, which means that the difference between the gain in the vehicle travelling direction and the gain in the vehicle width direction could increase.

The front portion 13 of the front antenna 111 is disposed so as to be set at an inclination of preferably at most ±10°, more preferably ±5° with respect to the vertical plane 91 perpendicular to the horizontal plane 90. Likewise, the front portion 13 of the rear antenna 112 is disposed so as to be set at an inclination of preferably at most ±10°, more preferably at most ±5° with respect to the vertical plane 91 perpendicular to the horizontal plane 90.

The front antenna 111 may be mounted to directly or indirectly to the front windshield 71 so as to have the front portion 13 disposed closer to the vehicle front side than a front portion 23, while the rear antenna 112 may be mounted directly or indirectly to the rear windshield 72 so as to have the front portion 13 disposed closer to the vehicle rear side than a front portion 23. This arrangement allows not only the front antenna 111 to increase the antenna gain in an area ranging from the vehicle front side to the vehicle width direction but also the rear antenna 112 to increase the antenna gain in an area ranging from the vehicle rear side to the vehicle width direction. Thus, the antenna gain increases in a range of 360° around a vehicle 80.

The front portion 23 of the front antenna 111 is disposed so as to be set at an inclination (inclination angle α) of preferably at most ±15° with respect to the vertical plane 91 perpendicular to the horizontal plane 90. This arrangement increases the antenna gain in a direction parallel to the horizontal plane 90 with respect to the front antenna 111 (direction toward the vehicle front side). The antenna has the side portion 21 and the side portion 22 disposed on both sides of the vehicle width direction so as to be apart from each other, increasing the antenna gain in the vehicle width direction. This is also applicable to the inclination angle α of the front portion 23 of the rear antenna 112.

The setting at an inclination of 0° means setting in parallel with the vertical plane 91.

In the antenna system 100 shown in FIG. 14, one vehicle antenna is mounted directly or indirectly to each of the front windshield 71 and the rear windshield 72.

The antenna system 100 may be configured such that at least one antenna is mounted directly or indirectly to each of at least two window glasses among the front windshield 71, the rear windshield 72 and a side lite 73.

Figure 15:
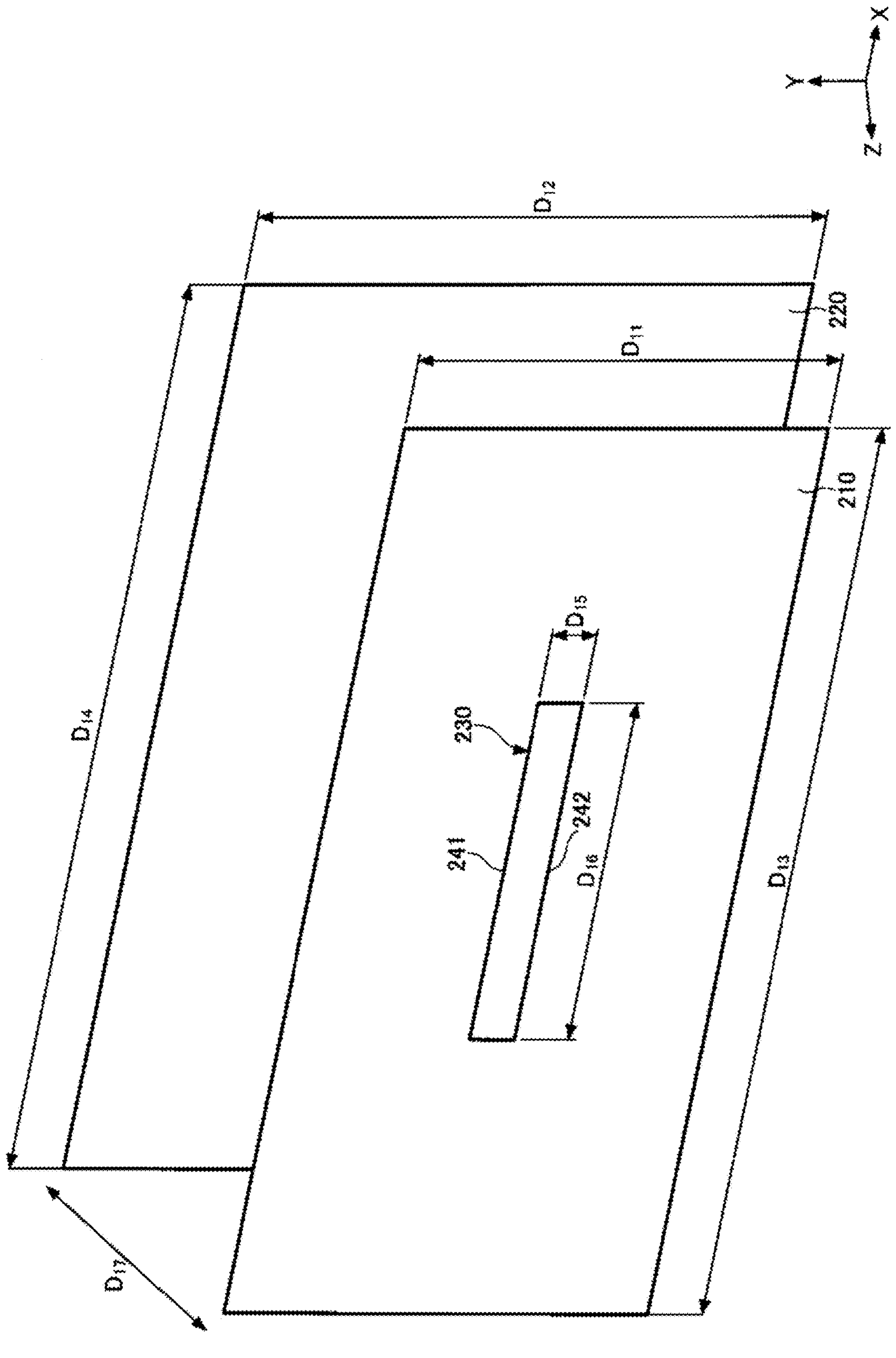
FIG. 15 is a perspective view illustrating the antenna in a comparative example.

FIG. 15 is a perspective view illustrating the antenna in a Comparative Example. The antenna shown in FIG. 15 includes two conductor plates 210 and 220 disposed so as to be apart from each other with a distance therebetween. The conductor plate 210 has a slot 230 formed therein. The antenna is fed at feeding points 241 and 242 on both sides of the slot 230.

Figure 16:
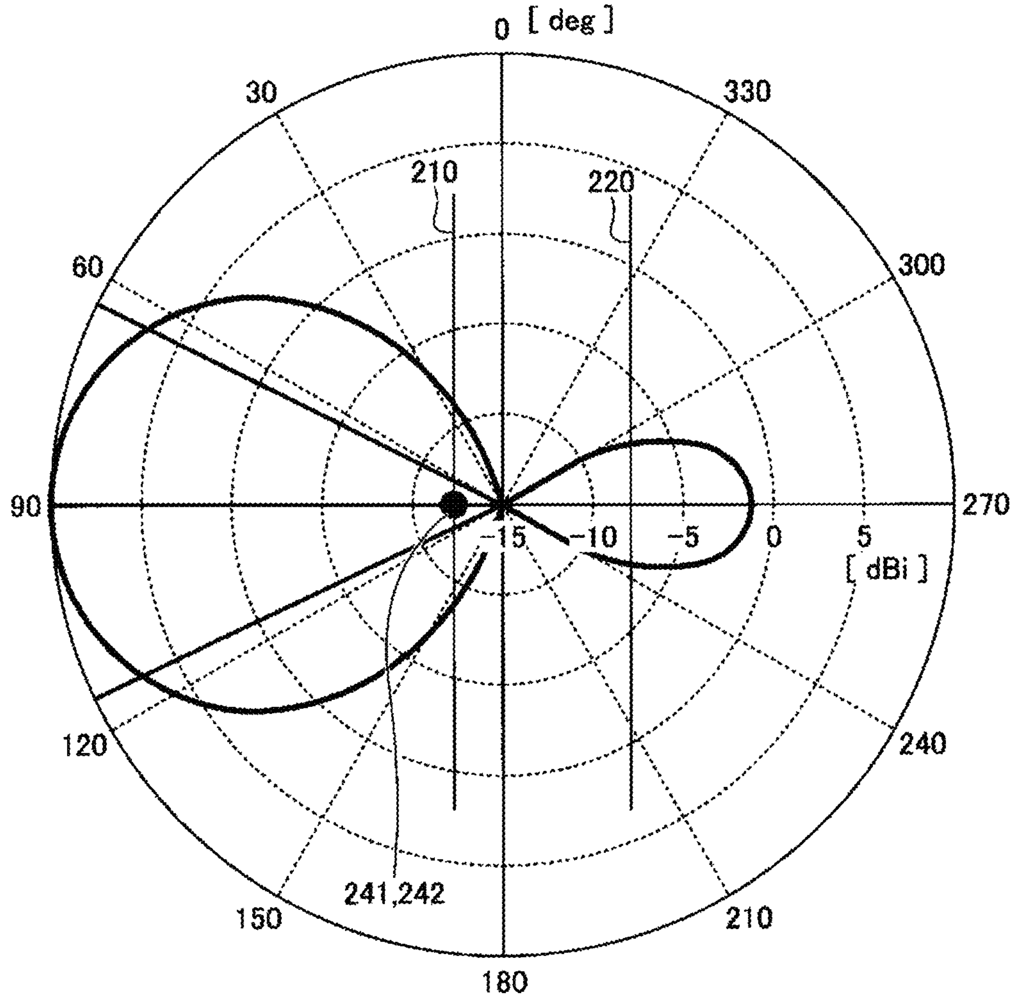
FIG. 16 is a view illustrating a simulation result of the directivity of the antenna according to the comparative example.

FIG. 16 is a view illustrating a simulation result of the directivity of the antenna according to the comparative example shown in FIG. 15 under a condition of a vertically polarized wave being applied at a frequency of 5.9 GHz. The antenna shown in FIG. 15 had a half-width of 52.5°, which was relatively narrow.

In the simulation shown in FIG. 16, the sizes of the respective elements of the antenna shown in FIG. 15 were in units of mm as follows:

$D_{11}$: 20
$D_{12}$: 27
$D_{13}$: 45
$D_{14}$: 45
$D_{15}$: 2
$D_{16}$: 17
$D_{17}$: 13

Figure 17:
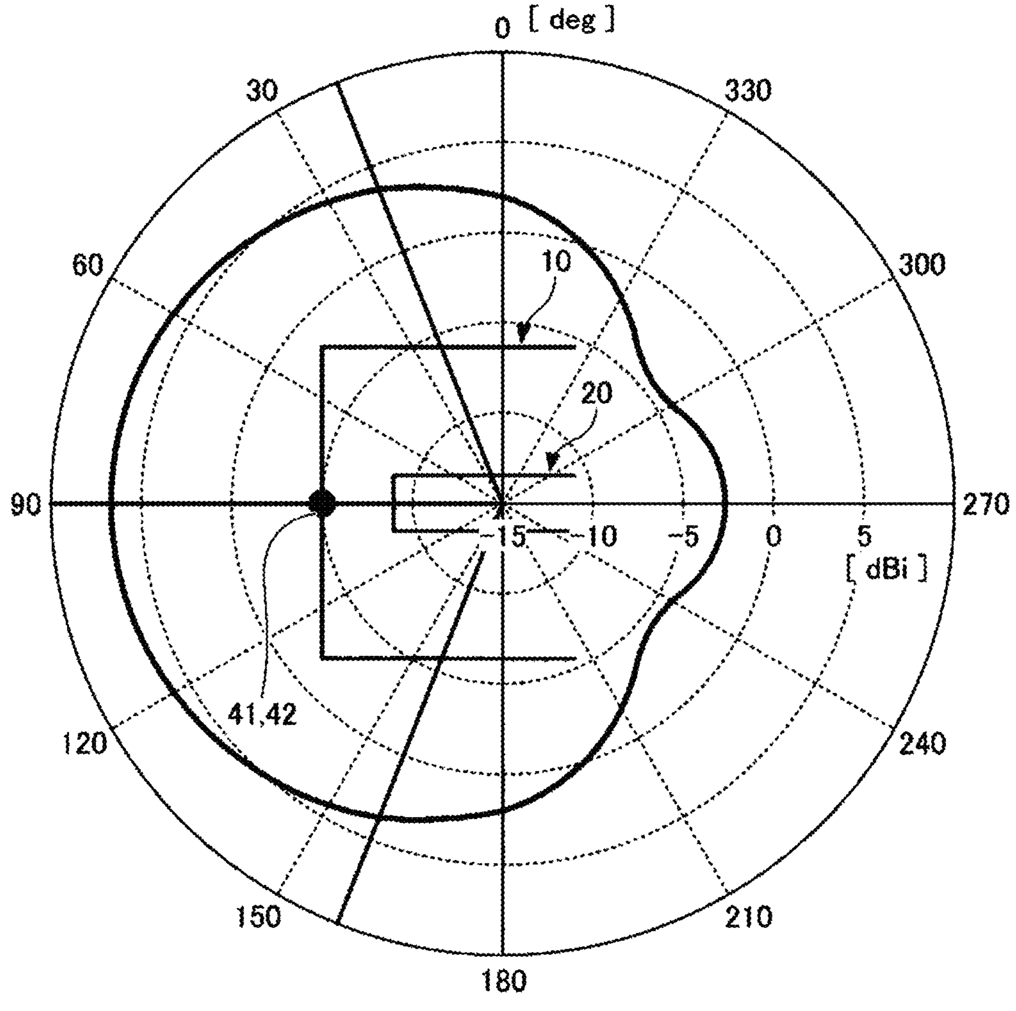
FIG. 17 is a view illustrating a simulation result of the directivity of the antenna according to the first embodiment.

In contrast, FIG. 17 is a view illustrating a simulation result of the directivity of the antenna 101 according to the first embodiment shown in FIGS. 1 and 2 on the ZX-plane under a condition of a vertically polarized wave being applied at a frequency of 5.9 GHz. The antenna 101 had a half-width of 138.0°, which was wider than the antenna according to the Comparative Example (antenna shown in FIG. 15). In other words, the antenna achieved a wider directivity.

In the simulation shown in FIG. 17, the sizes of the respective elements of the antenna 101 were in units of mm as follows:

$L_1$: 20
$L_2$: 20
$D_1$: 2
$D_2$: 14
$D_3$: 17
$D_4$: 10
$D_5$: 3

In this simulation, the length $D_3$ of the slot 30 in the longitudinal direction was set at the same value of the distance between the edge 17 and the edge 18 of the front portion 13.

Explanation of the embodiments has been made as mentioned above. The idea of the disclosure is not limited to the embodiments. Various modifications and improvements, such as a combination of a part or all of the elements of another embodiment, can be made.

REFERENCE SYMBOLS

10: outer conductor plate
10*a*: upper end
10*b*: lower end
11, 12, 21 and 22: side portion
13 and 23: front portion
14 and 24: U-shaped portion
15 and 16: surface portion
17, 18, 27 and 28: edge
20: inner conductor plate
20*a*: upper end
20*b*: lower end
29: opening
30: slot
31 and 32: slot end
33 and 34: longitudinal side
35: central portion
41 and 42: feeding point
50: bottom
56 and 57: point of contact
51, 52 and 53: tangent
54 and 55: straight line
58 and 59: intersection
60: coaxial cable
61: outer conductor
62: center conductor
63: coplanar line
64: dielectric substrate
65: strip conductor
66*a* and 66*b*: grounding plane
67*a*, 67*b* and 67*c*: connection conductor
68: matching circuit
71: front windshield
72: rear windshield
73: side lite
80: vehicle
90: horizontal plane
91: vertical plane
100: antenna system
101: antenna
111: front antenna
112: rear antenna
210 and 220: conductor plate
230: slot
241 and 242: feeding point

What is claimed is:

1. An antenna comprising:

a first conductor plate and a second conductor plate, the second conductor plate being disposed in the first conductor plate so as to be apart from the first conductor plate with a distance between both plates;

wherein the first conductor plate includes a first U-shaped portion, the first U-shaped portion being formed in a U-shape so as to include a first side portion, a second side portion opposed to the first side portion, and a first front portion connected between the first side portion and the second side portion;

wherein the second conductor plate includes a second U-shaped portion, the second U-shaped portion being formed in a U-shape so as to include a third side portion, a fourth side portion opposed to the third side portion, and a second front portion connected between the third side portion and the fourth side portion;

wherein the second front portion is opposed to the first front portion;

wherein the first front portion has a slot formed therein so as to divide at least one area of the first front portion into a first surface portion and a second surface portion;

wherein the first surface portion has a first feeding point; and wherein the second surface portion has a second feeding point.

2. The antenna according to claim 1, further comprising a first side between the first front portion and the first side portion, and a second side between the first front portion and the second side portion, wherein each of the first side and the second side includes at least one line segment.

3. The antenna according to claim 2, wherein the slot extends in a direction intersecting to both of the first side and the second side.

4. The antenna according to claim 3, wherein the slot extends in a direction substantially orthogonal to both of the first side and the second side.

5. The antenna according to claim 1, wherein the first front portion extends in a direction substantially orthogonal to both of the first side portion and the second side portion.

6. The antenna according to claim 1, wherein the second front portion is substantially in parallel with the first front portion.

7. The antenna according to claim 1, wherein the second front portion extends in a direction substantially orthogonal to both of the third side portion and the fourth side portion.

8. The antenna according to claim 1, wherein the first side portion is substantially in parallel with the third side portion opposed to the first side portion; and wherein the second side portion is substantially in parallel with the fourth side portion opposed to the second side portion.

9. The antenna according to claim 1, wherein the first conductor plate has a size $L_1$ in a direction substantially orthogonal to a longitudinal direction of the slot, and the second conductor plate has a size $L_2$ in a direction substantially orthogonal to the longitudinal direction of the slot; and wherein $L_2$ is at least 0.75 times and at most 1.5 times as long as $L_1$.

10. The antenna according to claim 1, wherein the second conductor plate has a portion protruding from the first conductor plate as seen in a side view of the first conductor plate.

11. The antenna according to claim 1, wherein the first feeding point and the second feeding point are disposed in the vicinity of a central portion of the slot.

12. The antenna according to claim 1, wherein the first front portion is formed in a substantially rectangular shape as seen in a front view of the first conductor plate;

wherein the slot is formed in a substantially oblong shape as seen in the front view of the first conductor plate;

wherein the first surface portion has a size $W_1$ in a direction substantially orthogonal to the longitudinal direction of the slot, and the second surface portion has a size $W_2$ in a direction substantially orthogonal to the longitudinal direction of the slot; and wherein $W_2$ is at least 0.1 times and at most 10 times as long as $W_1$.

13. The antenna according to claim 12, wherein the first conducive plate has a size $L_1$ in a direction substantially orthogonal to a longitudinal direction of the slot, and the antenna transmits and receives a radio wave having an effective wavelength $\lambda_g$ in a dielectric substance; and wherein $L_1$ is at least $0.1\times\lambda_g$ and at most $0.6\times\lambda_g$.

14. The antenna according to claim 1, wherein the first side portion and the third side portion opposed to the first side portion are apart from each other with a distance $d_1$, the second side portion and the fourth side portion opposed to the second side portion are apart from each other with a distance $d_2$, and the antenna transmits and receives a radio wave having an effective wavelength $\lambda_g$ in a dielectric substance; and wherein at least one of $d_1$ or $d_2$ is at least $0.05\times\lambda_g$ and at most $0.5\times\lambda g$.

15. The antenna according to claim 1, wherein a distance between the first front portion and the second front portion is $d_3$, and the antenna transmits and receives a radio wave having an effective wavelength $\lambda_g$ in a dielectric substance, and wherein $d_3$ is larger than 0 and at most $0.3\times\lambda_g$.

16. The antenna according to claim 1, further comprising a feeding line electrically connected to the first feeding point and the second feeding point; wherein the second front portion has an opening formed therein so as to pass the feeding line therethrough.

17. The antenna according to claim 1, wherein the first front portion has a conductor face at positions where the first feeding point and the second feeding point are respectively projected as seen in a front view of the first conductor plate.

18. The antenna according to claim 17, further comprising a feeding line electrically connected to the first feeding point and the second feeding point; wherein the feeding line partly passes between the first front portion and the second front portion.

19. The antenna according to claim 1, further comprising a planar waveguide electrically connected to the first feeding point and the second feeding point;

wherein the planar waveguide partly passes between the first front portion and the second front portion.

20. The antenna according to claim 19, wherein the second conductor plate comprises a parasitic conductor.

* * * * *